US012381327B2

(12) United States Patent
Onaka et al.

(10) Patent No.: US 12,381,327 B2
(45) Date of Patent: Aug. 5, 2025

(54) ANTENNA MODULE AND COMMUNICATION DEVICE INCLUDING THE SAME

(71) Applicant: Murata Manufacturing Co., Ltd., Nagaokakyo (JP)

(72) Inventors: Kengo Onaka, Nagaokakyo (JP); Ryo Komura, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 104 days.

(21) Appl. No.: 18/539,314

(22) Filed: Dec. 14, 2023

(65) Prior Publication Data

US 2024/0113433 A1 Apr. 4, 2024

Related U.S. Application Data

(63) Continuation of application No. PCT/JP2022/021403, filed on May 25, 2022.

(30) Foreign Application Priority Data

Jun. 18, 2021 (JP) ................................ 2021-101797

(51) Int. Cl.
*H01Q 5/378* (2015.01)
*H01Q 1/24* (2006.01)
(Continued)

(52) U.S. Cl.
CPC ........... *H01Q 9/0414* (2013.01); *H01Q 1/243* (2013.01); *H01Q 1/48* (2013.01); *H01Q 5/378* (2015.01)

(58) Field of Classification Search
CPC .... H01Q 1/38–48; H01Q 9/04; H01Q 1/2283; H01Q 1/243; H01Q 21/0025; H01Q 21/065; H01Q 5/378–392
See application file for complete search history.

(56) References Cited

U.S. PATENT DOCUMENTS 10,763,589 B2 * 9/2020 Wu ........................ H01Q 5/385
11,296,415 B2 * 4/2022 Fabrega Sanchez ........................ H01Q 21/065
11,532,894 B2 * 12/2022 Kim .................. H01Q 21/0006

FOREIGN PATENT DOCUMENTS

JP H05-504034 A 6/1993
WO 2020/027058 A1 2/2020
(Continued)

OTHER PUBLICATIONS

International Search Report and Written Opinion mailed on Aug. 9, 2022, received for PCT Application PCT/JP2022/021403, filed on May 25, 2022, 8 pages including English Translation.

*Primary Examiner* — Hasan Islam
(74) *Attorney, Agent, or Firm* — XSENSUS LLP

(57) ABSTRACT

An antenna module including a dielectric substrate having a long side and a short side, a ground electrode, a radiating element, a peripheral electrode, and a parasitic element. The radiating element is disposed to face the ground electrode. The peripheral electrode is disposed along the long side of the dielectric substrate and is electrically connected to the ground electrode. The parasitic element is disposed along the short side of the dielectric substrate and is disposed away from the radiating element. The radiating element is configured to emit radio waves in two polarization directions along the long side and the short side of the dielectric substrate. The shortest distance between the radiating element and the parasitic element is greater than the shortest distance between the radiating element and the peripheral electrode.

20 Claims, 16 Drawing Sheets

(51) Int. Cl.

| | |
|---|---|
| ***H01Q 1/48*** | (2006.01) |
| ***H01Q 9/04*** | (2006.01) |

(56) References Cited

FOREIGN PATENT DOCUMENTS

| | | | |
|---|---|---|---|
| WO | 2021/059661 | A1 | 4/2021 |
| WO | 2021/059738 | A1 | 4/2021 |

* cited by examiner (A)WITHOUT PARASITIC ELEMENTS (B)WITH PARASITIC ELEMENTS

ANTENNA MODULE AND COMMUNICATION DEVICE INCLUDING THE SAME

CROSS-REFERENCE TO RELATED APPLICATIONS

This is a continuation application of PCT/JP2022/021403, filed on May 25, 2022, designating the United States of America, which is based on and claims priority to Japanese Patent Application No. JP 2021-101797 filed on Jun. 18, 2021. The entire contents of the above-identified applications, including the specifications, drawings and claims, are incorporated herein by reference in their entirety.

TECHNICAL FIELD

This disclosure relates to an antenna module and a communication device including the antenna module and more particularly relates to a technology for increasing the frequency band of an antenna module.

BACKGROUND ART

International Publication No. 2021/059661 (Patent Document 1) discloses a configuration of an antenna module in which peripheral electrodes are disposed around a radiating element with a planar shape. The peripheral electrodes are disposed in a layer of a dielectric substrate between the radiating element and a ground electrode and are electrically connected to the ground electrode. In the antenna module disclosed in International Publication No. 2021/059661 (Patent Document 1), the distance between the radiating element and the peripheral electrodes is less than the distance between the radiating element and the ground electrode. Therefore, the degree of coupling between the radiating element and the peripheral electrodes becomes stronger, and the Q value increases. This suppresses the emission of radio waves from the radiating element toward the back side of the ground electrode and thereby makes it possible to suppress the decrease in the antenna gain even when the area of the ground electrode is limited.

CITATION LIST

Patent Document

Patent Document 1: International Publication No. 2021/059661

SUMMARY OF DISCLOSURE

Generally, an antenna module has a tendency that a higher Q value is favorable in terms of the antenna gain, and a lower Q value is favorable in terms of the frequency bandwidth. For this reason, with an antenna module including peripheral electrodes, while it is possible to suppress the decrease in the antenna gain, a desired frequency bandwidth cannot always be achieved depending on the required specification.

This disclosure is made to solve the above-described problem, and one object of this disclosure is to increase the frequency bandwidth of an antenna module including a peripheral electrode while maintaining the antenna gain.

Solution to Problem

An antenna module according to a first aspect of this disclosure includes a dielectric substrate having a long side and a short side, a ground electrode disposed in the dielectric substrate, a planar radiating element, a first peripheral electrode, and a parasitic element. The radiating element is disposed to face the ground electrode. The first peripheral electrode is disposed along the long side of the dielectric substrate and is electrically connected to the ground electrode. The parasitic element is disposed along the short side of the dielectric substrate and disposed away from the radiating element. The radiating element is configured to emit radio waves in a first polarization direction along the long side of the dielectric substrate and a second polarization direction along the short side of the dielectric substrate. The shortest distance between the radiating element and the parasitic element is greater than the shortest distance between the radiating element and the first peripheral electrode.

An antenna module according to a second aspect of this disclosure includes a dielectric substrate having a long side and a short side, a ground electrode disposed in the dielectric substrate, a first antenna, and a second antenna. The second antenna is disposed adjacent to the first antenna in a first direction along the long side of the dielectric substrate. Each of the first antenna and the second antenna includes a planar radiating element disposed to face the ground electrode, a peripheral electrode, and a parasitic element. The peripheral electrode is disposed along the long side of the dielectric substrate and electrically connected to the ground electrode. The parasitic element is disposed along the short side of the dielectric substrate and is disposed away from the radiating element. The radiating element is configured to emit radio waves in a first polarization direction along the long side of the dielectric substrate and a second polarization direction along the short side of the dielectric substrate. In each of the first antenna and the second antenna, the shortest distance between the radiating element and the parasitic element is greater than the shortest distance between the radiating element and the peripheral electrode.

An antenna module of this disclosure includes a planar radiating element disposed in a dielectric substrate having a long side and a short side, a parasitic element disposed along the short side of the dielectric substrate, and a peripheral electrode disposed along the long side of the dielectric substrate; and the electromagnetic field coupling between the radiating element and the peripheral electrode can be adjusted by disposing the parasitic element further away from the radiating element than the peripheral electrode. This in turn makes it possible to increase the frequency bandwidth while maintaining the antenna gain of the antenna module.

DESCRIPTION OF EMBODIMENTS

Figure 1:
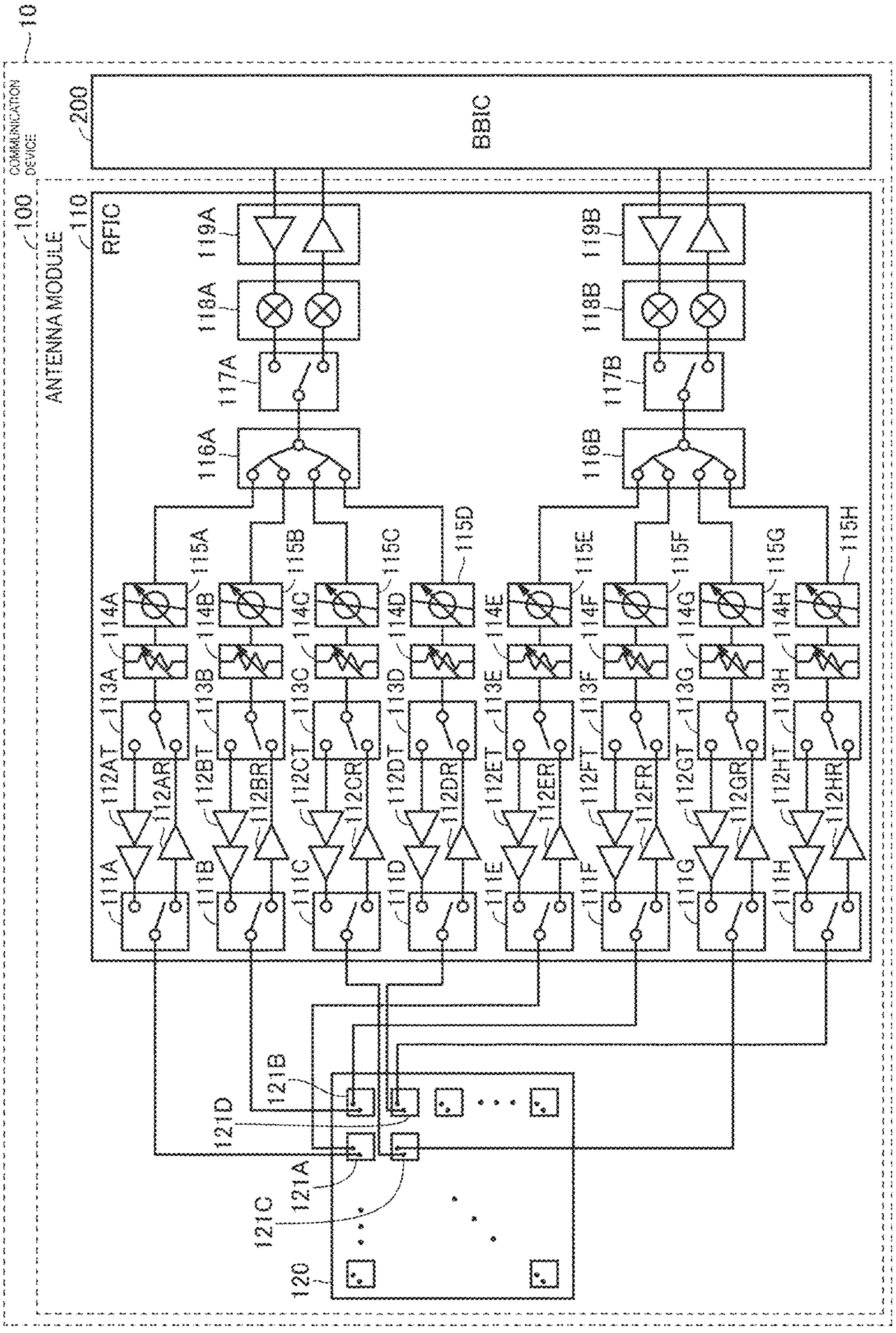
FIG. 1 is a block diagram of a communication device for which an antenna module according to a first embodiment is used.

Embodiments of this disclosure are described in detail below with reference to the drawings. The same reference number is assigned to the same or similar components in the drawings, and the descriptions of those components are not repeated.

First Embodiment (Basic Configuration of Communication Device)

FIG. 1 is an example of a block diagram of a communication device 10 for which an antenna module 100 according to a first embodiment is used. The communication device 10 is, for example, a mobile terminal, such as a mobile phone, a smartphone, or a tablet computer, or a personal computer having a communication function. Examples of frequency bands of radio waves used for the antenna module 100 according to the present embodiment include millimeter bands with center frequencies of 28 GHz, 39 GHz, and 60 GHz. However, radio waves in frequency bands other than these frequency bands may also be used.

Referring to FIG. 1, the communication device 10 includes the antenna module 100 and a BBIC 200 that constitutes a baseband signal processing circuit. The antenna module 100 includes an RFIC 110, which is an example of a feed circuit, and an antenna device 120. In the communication device 10, the RFIC 110 up-converts signals transmitted from the BBIC 200 to the antenna module 100 into radio frequency signals, and the antenna device 120 emits the radio frequency signals. Also, in the communication device 10, radio frequency signals received by the antenna device 120 are transmitted to the RFIC 110, the RFIC 110 down-converts the radio frequency signals, and the BBIC 200 processes the down-converted signals.

In FIG. 1, for ease of description, configurations corresponding to four radiating elements 121A to 121D (which are also collectively referred to as "radiating elements 121") among multiple radiating elements (feed elements) constituting the antenna device 120 are illustrated, and configurations corresponding to other radiating elements having similar configurations are omitted. Also, although FIG. 1 illustrates an example in which the antenna device 120 is formed of multiple radiating elements 121 arranged in a two-dimensional array, multiple radiating elements 121 may instead be arranged in a one-dimensional array, i.e., in one row. Furthermore, the antenna device 120 may have a configuration including one radiating element 121. In the present embodiment, each radiating element 121 is a patch antenna with a planar shape.

The antenna device 120 is a so-called dual polarization antenna device including radiating elements each of which can emit two radio waves with different polarization directions. Each radiating element 121 receives a radio frequency signal for first polarization and a radio frequency signal for second polarization from the RFIC 110.

The RFIC 110 includes switches 111A to 111H, 113A to 113H, 117A, and 117B; power amplifiers 112AT to 112HT, low noise amplifiers 112AR to 112HR; attenuators 114A to 114H; phase shifters 115A to 115H; a signal combiner/splitter 116A; a signal combiner/splitter 116B; mixers 118A and 118B; and amplifier circuits 119A and 119B. Among these components, the switches 111A to 111D, 113A to 113D, and 117A, the power amplifiers 112AT to 112DT, the low noise amplifiers 112AR to 112DR, the attenuators 114A to 114D, the phase shifters 115A to 115D; the signal combiner/splitter 116A, the mixer 118A, and the amplifier circuit 119A constitute a circuit for radio frequency signals for the first polarization. Also, the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal combiner/splitter 116B, the mixer 118B, and the amplifier circuit 119B constitute a circuit for radio frequency signals for the second polarization.

When transmitting radio frequency signals, the switches 111A to 111H and 113A to 113H are switched to the power amplifiers 112AT to 112HT, and the switches 117A and 117B are connected to transmission amplifiers of the amplifier circuits 119A and 119B. When receiving radio frequency signals, the switches 111A to 111H and 113A to 113H are switched to the low noise amplifiers 112AR to 112HR, and the switches 117A and 117B are connected to reception amplifiers of the amplifier circuits 119A and 119B.

Signals transmitted from the BBIC 200 are amplified by the amplifier circuits 119A and 119B and up-converted by the mixers 118A and 118B. Each transmission signal, which is a radio frequency signal obtained by the up-conversion, is split into four signals by one of the signal combiner/splitter 116A and the signal combiner/splitter 116B; and the four signals pass through the corresponding signal paths and are supplied to different radiating elements 121. Here, the directivity of the antenna device 120 can be adjusted by individually adjusting the degrees of phase shift of the phase shifters 115A to 115H disposed in the respective signal paths. Also, the attenuators 114A to 114H adjust the strengths of the transmission signals.

The radio frequency signals from the switches 111A and 111E are supplied to the radiating element 121A. Similarly, the radio frequency signals from the switches 111B and 111F are supplied to the radiating element 121B. The radio frequency signals from the switches 111C and 111G are supplied to the radiating element 121C. The radio frequency signals from the switches 111D and 111H are supplied to the radiating element 121D.

Reception signals, which are radio frequency signals received by the radiating elements 121, are transmitted to the RFIC 110, pass through four different signal paths, and are combined by the signal combiner/splitter 116A and the signal combiner/splitter 116B. The combined reception signals are down-converted by the mixers 118A and 118B, amplified by the amplifier circuits 119A and 119B, and transmitted to the BBIC 200.

(Configuration of Antenna Module)

Figure 2:
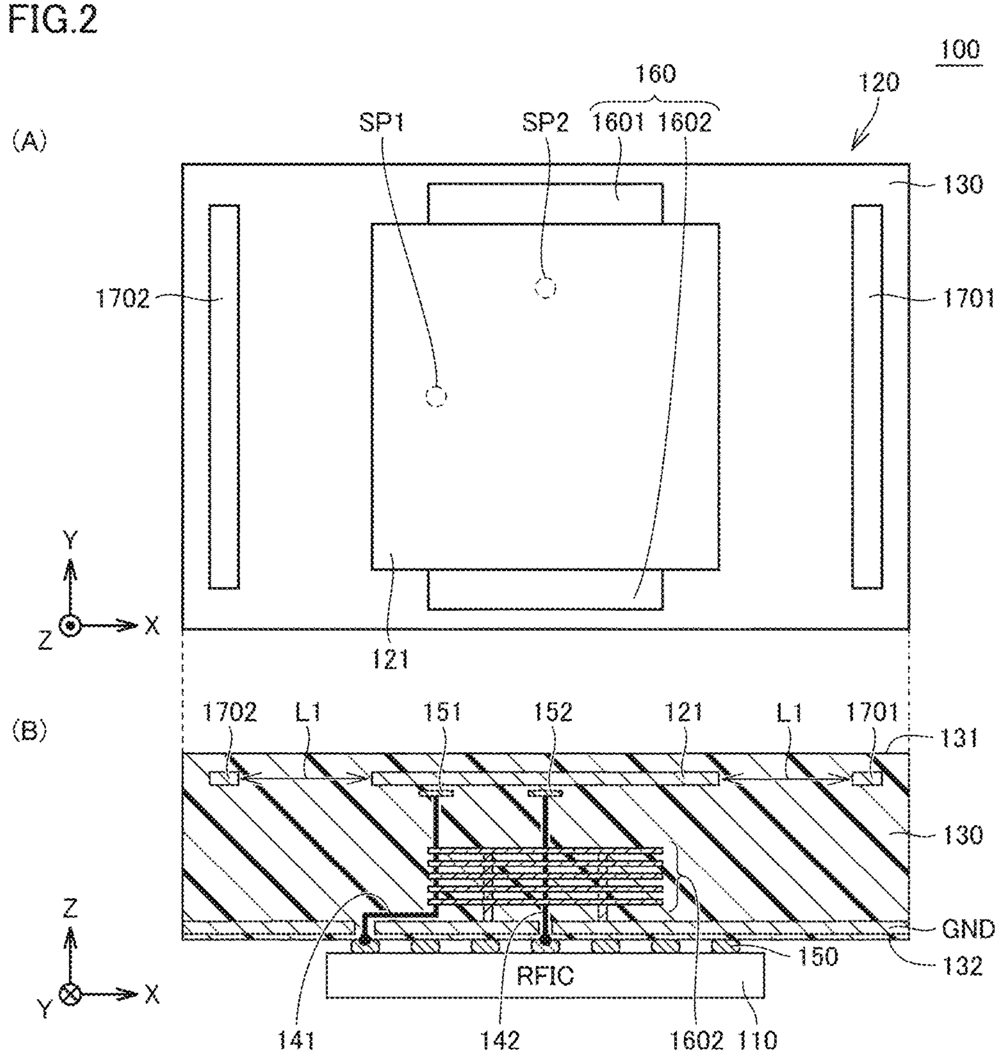
FIG. 2 is a plan view of the antenna module according to the first embodiment and a side transparent view of the antenna module seen from a Y-axis direction.
Figure 3:
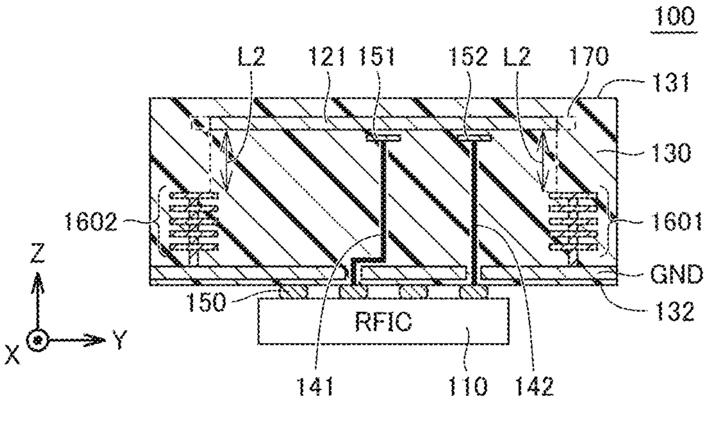
FIG. 3 is a side transparent view, which is seen from an X-axis direction, of the antenna module according to the first embodiment.

Next, details of the configuration of the antenna module 100 according to the first embodiment are described with reference to FIGS. 2 and 3. FIGS. 2 and 3 illustrate the antenna module 100 according to the first embodiment. The antenna module 100 includes, in addition to the radiating element 121 and the RFIC 110, a dielectric substrate 130, feeding wires 141 and 142, peripheral electrodes 1601 and 1602, parasitic elements 1701 and 1702, and a ground electrode GND.

In the descriptions below, the normal direction (the direction in which a radio wave is emitted) of the dielectric substrate 130 is referred to as a Z-axis direction, and a plane perpendicular to the Z-axis direction is defined by the X-axis and the Y-axis. Also, in each diagram, the positive Z-axis direction may be referred to as an upper side, and the negative Z-axis direction may be referred to as a lower side. In FIG. 2, the upper diagram (FIG. 2 (A)) is a plan view of the antenna module 100, and the lower diagram (FIG. 2 (B)) is a side transparent view of the antenna module 100 seen from the Y-axis direction. Also, FIG. 3 is a side transparent view of the antenna module 100 seen from the X-axis direction.

The dielectric substrate 130 is, for example, a low-temperature co-fired ceramics (LTCC) multilayer substrate, a multilayer resin substrate formed by stacking multiple resin layers comprised of a resin such as epoxy or polyimide, a multilayer resin substrate formed by stacking multiple resin layers comprised of a liquid crystal polymer (LCP) with a lower permittivity, a multilayer resin substrate formed by stacking multiple resin layers comprised of a fluororesin, a multilayer resin substrate formed by stacking multiple resin layers comprised of a polyethylene terephthalate (PET) material, or a multilayer substrate comprised of ceramics other than LTCC. The dielectric substrate 130 does not necessarily have a multilayer structure and may be a single-layer substrate.

The dielectric substrate 130 has a substantially rectangular shape in plan view from the normal direction (the Z-axis direction). The dimension of the dielectric substrate 130 along the X-axis is longer than the dimension along the Y-axis. That is, the sides along the X-axis are the long sides, and the sides along the Y-axis are the short sides. The radiating element 121 is disposed in a layer (upper-side layer) closer to an upper surface 131 (a surface facing the positive Z-axis direction) of the dielectric substrate 130. The radiating element 121 may be exposed on the surface of the dielectric substrate 130 or may be disposed inside of the dielectric substrate 130 as in the example of FIG. 2 (B). Also, the shape of the dielectric substrate 130 is not necessarily limited to a strictly rectangular shape. The dielectric substrate 130 may have a shape with rounded or partially cut-off corners or may have a shape having indented parts or protrusions in the middle of its sides.

The ground electrode GND is disposed across the entire surface of the dielectric substrate 130 at a position close to a lower surface 132 of the dielectric substrate 130. Also, the RFIC 110 is mounted on the lower surface 132 of the dielectric substrate 130 via solder bumps 150. The RFIC 110 may be connected to the dielectric substrate 130 by using, for example, a multipolar connector and a flexible substrate instead of solder connection.

The radiating element 121 is a planar electrode with a substantially square shape. The radiating element 121 receives radio frequency signals from the RFIC 110 via the feeding wires 141 and 142. The feeding wire 141 extends from the RFIC 110, passes through the ground electrode GND, and is capacitively coupled to a feeding point SP1 of the radiating element 121 via a planar electrode 151. The feeding wire 142 extends from the RFIC 110, passes through the ground electrode GND, and is capacitively coupled to a feeding point SP2 of the radiating element 121 via a planar electrode 152. The feeding wires 141 and 142 may instead be directly connected to the feeding points SP1 and SP2.

The feeding point SP1 is offset from the center of the radiating element 121 in the negative X-axis direction, and the feeding point SP2 is offset from the center of the radiating element 121 in the positive Y-axis direction. With this configuration, a radio wave with a polarization direction corresponding to the X-axis direction and a radio wave with a polarization direction corresponding to the Y-axis direction are emitted from the radiating element 121. That is, the antenna module 100 is a dual polarization antenna module.

In FIGS. 2 and 3, each of the feeding wires 141 and 142 is illustrated as a straight via extending in the normal direction in the dielectric substrate 130. However, each of the feeding wires 141 and 142 may have a zigzag shape formed by alternately arranging vias and planar electrodes. When a straight via is used, the dielectric substrate 130 may be distorted during the molding process of the dielectric substrate 130 due to the difference between the expansion coefficients of a conductive metal forming the via and a dielectric material surrounding the via. As a result, the flatness of the dielectric substrate 130 may be reduced, or defects, such as cracks, may be generated. Forming each of the feeding wires 141 and 142 in a zigzag shape makes it possible to distribute portions with high remaining copper rates in the thickness direction (the Z-axis direction) of the dielectric substrate 130 and thereby makes it possible to reduce defects in the dielectric substrate 130.

In the antenna module 100, the peripheral electrode 1601 is disposed along the long side at the positive Y-axis end (i.e., a side along the X-axis direction) of the dielectric substrate 130. Further, the peripheral electrode 1602 is disposed along the long side at the negative Y-axis end of the dielectric substrate 130. In the descriptions below, the peripheral electrodes 1601 and 1601 may be collectively referred to as a "peripheral electrode 160". The peripheral electrode 160 is disposed between the radiating element 121 and the ground electrode GND in the normal direction (the Z-axis direction) of the dielectric substrate 130.

The peripheral electrode 160 includes multiple planar electrodes that have a rectangular shape and extend in the Y-axis direction in plan view from the normal direction (the positive Z-axis direction) of the dielectric substrate 130 and vias that connect the multiple planar electrodes to the ground electrode GND. The multiple planar electrodes are arranged in different positions in the normal direction of the dielectric substrate 130. In plan view from the normal direction of the dielectric substrate 130, the peripheral electrode 160 partially overlaps the radiating element 121. Although not illustrated in the diagrams, the peripheral electrode 160 may have a protrusion extending in the Y-axis direction, and the protrusion may overlap the radiating element 121 in plan view from the normal direction of the dielectric substrate 130.

The dimension of the peripheral electrode 160 along the X-axis direction is shorter than the dimension of a side of the radiating element 121 along the X-axis direction. The peripheral electrode 160 is disposed near the center of the radiating element 121 in the X-axis direction.

In the antenna module 100, the parasitic elements 1701 and 1702 are disposed along the short sides (i.e., sides along the Y-axis direction) of the dielectric substrate 130. The parasitic element 1701 is disposed away from the radiating element 121 in the positive X-axis direction. Also, the parasitic element 1702 is disposed away from the radiating element 121 in the negative X-axis direction. The dimension of the parasitic element 170 along the Y-axis direction is longer than the dimension of a side of the radiating element 121 along the Y-axis direction. In the descriptions below, the parasitic elements 1701 and 1702 may be collectively referred to as a "parasitic element 170".

The shortest distance (a distance L1 in FIG. 2) between the radiating element 121 and the parasitic element 170 is greater than the shortest distance (a distance L2 in FIG. 3) between the radiating element 121 and the peripheral electrode 160.

(Functions of Peripheral Electrode and Parasitic Element)

As illustrated in FIG. 2, the dimension of the dielectric substrate 130 in the Y-axis direction is shorter than the dimension of the dielectric substrate 130 in the X-axis direction; and in plan view of the dielectric substrate 130, the distances between the ends of the radiating element 121 and the ends of the dielectric substrate 130 (i.e., the ground electrode GND) in the Y-axis direction are limited. Therefore, with a configuration not including the peripheral electrode 160, regarding a radio wave with a polarization direction corresponding to the Y-axis direction, the electric lines of force originated from the radiating element 121 go around to the lower surface 132 of the ground electrode GND and as a result, the antenna gain may be reduced.

In contrast, when the peripheral electrode 160 connected to the ground electrode GND is disposed between the radiating element 121 and the ground electrode GND as in the antenna module 100 of the first embodiment, the distance between the radiating element 121 and the ground potential (the peripheral electrode 160) is decreased and as a result, the electric lines of force preferentially originate in a region between the radiating element 121 and the peripheral electrode 160. As a result, the generation of electric fields that go around toward the ground electrode GND is suppressed, and the Q value of the antenna module is increased. This in turn makes it possible to suppress the reduction of the antenna gain regarding radio waves with a polarization direction corresponding to the Y-axis direction and suppress the influence from other devices disposed around the antenna module 100.

When the dimension of the peripheral electrode 160 in the X-axis direction is greater than or equal to the dimension of the radiating element 121 in the X-axis direction, the electric lines of force originated at the ends of the radiating element 121 in the X-axis direction may be coupled with the peripheral electrode 160, and the cross polarization discrimination (XPD) may be reduced. For this reason, in the antenna module 100, the dimension of the peripheral electrode 160 in the X-axis direction is made shorter than the dimension of the radiating element 121 in the X-axis direction, and the peripheral electrode 160 is disposed near the center of the radiating element 121.

In general, when the coupling between a radiating element and a ground electrode becomes stronger and the Q value of an antenna module increases, the frequency band of an emitted radio wave tends to become narrower compared with a case in which the Q value is low. In recent years, the need for a higher gain and a wider band has been growing, and a desired frequency band cannot always be achieved depending on the required specification.

To address the above problem, in the antenna module 100 of the first embodiment, the parasitic element 170 is disposed away from the radiating element 121 in the X-axis direction to adjust the balance between the electromagnetic field coupling between the radiating element 121 and the parasitic element 170 and the electromagnetic field coupling between the radiating element 121 and the peripheral electrode 160. Adjusting this balance makes it possible to achieve a desired matching and a desired frequency bandwidth.

When an electrode, such as the parasitic element 170, extending in the Y-axis direction is disposed away from the radiating element 121 in the X-axis direction, the electrode exhibits two resonant modes: an even mode and an odd mode. When an electric current flows through the radiating element 121 in the Y-axis direction, an electric current flows through the electrode in the same direction in the even mode, and an electric current flows through the electrode in the opposite direction in the odd mode.

The difference in the resonant frequency between the even mode and the odd mode depends on the distance between the radiating element 121 and the parasitic element 170. When the distance between the radiating element 121 and the parasitic element 170 decreases, the electromagnetic field coupling becomes stronger, and the difference in the resonant frequency between the even mode and the odd mode increases. When the distance between the radiating element 121 and the parasitic element 170 increases, the electromagnetic field coupling between the radiating element 121 and the parasitic element 170 becomes weaker, and the resonant frequency in the odd mode becomes closer to the resonant frequency in the even mode. By adjusting the distance between the radiating element 121 and the parasitic element 170 to achieve loose electromagnetic field coupling and adjusting the size of the parasitic element 170 appropriately, the reflected power between the resonant frequency in the even mode and the resonant frequency in the odd mode is decreased and as a result, the frequency bandwidth is increased.

Figure 4:
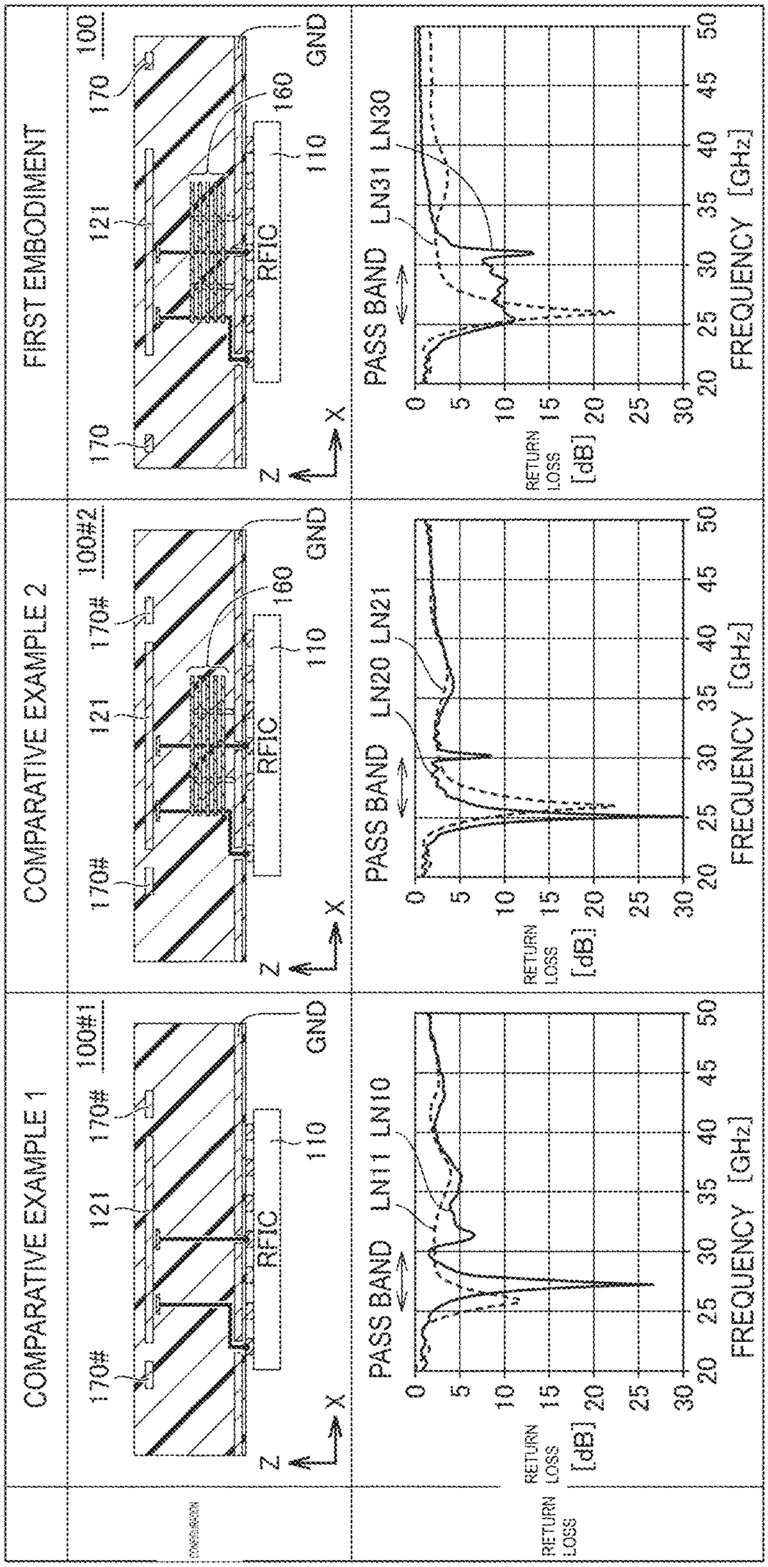
FIG. 4 is a first diagram for describing antenna characteristics in the first embodiment and comparative examples.

Such changes in the antenna characteristics are described with reference to FIG. 4. FIG. 4 includes schematic diagrams (the upper row) and simulation results (the lower row) of return loss of a radio wave with a polarization direction corresponding to the Y-axis direction for the first embodiment and comparative examples 1 and 2. In the simulation, the 28 GHz band (24.25 GHz to 29.5 GHz) is used as the frequency band of the radiating element 121.

Referring to FIG. 4, an antenna module 100#1 of the comparative example 1 does not include any peripheral electrode and has a configuration in which parasitic elements 170# are disposed closer to the radiating element 121 than in the first embodiment. An antenna module 100#2 of the comparative example 2 includes the peripheral electrode 160 in addition to the parasitic elements 170#. In each case, a solid line (LN10, LN20, or LN30) represents return loss when parasitic elements are provided, and a dotted line (LN11, LN21, or LN31) represents return loss when parasitic elements are not provided.

In the case of the antenna module 100#1 of the comparative example 1, when the parasitic elements 170# are not provided, the resonant frequency is about 26 GHz (the dotted line LN11). On the other hand, when the parasitic elements 170# are provided, the resonant frequency in the even mode is about 27.3 GHz, and the resonant frequency in the odd mode is about 31.5 GHz (the solid line LN10). However, even when the parasitic elements 170# are provided, the reflected power in the frequency band between the resonant frequency in the even mode and the resonant frequency in the odd mode is large, and a return loss of 6 dB or more is not maintained in the target frequency band.

In the case of the antenna module 100#2 of the comparative example 2, because the peripheral electrode 160 is provided, the reflected power at the resonant frequency (about 26 GHz) when the parasitic elements 170# are not provided and the reflected power at the resonant frequency (about 25 GHz) in the even mode when the parasitic elements 170# are provided are lower than those in the comparative example 1. However, even when the parasitic elements 170# are provided, although the reflected power is somewhat improved by the provision of the peripheral electrode compared with the comparative example 1, the reflected power in the frequency band between the resonant frequency in the even mode and the resonant frequency (about 30 GHz) in the odd mode is still high, and a desired return loss is not maintained in the target frequency band.

In the antenna module 100 of the first embodiment, the electromagnetic field coupling between the radiating element 121 and the parasitic element 170 is weakened by disposing the parasitic element 170 away from the radiating element 121. With this configuration, although the reflected power at the resonant frequency (about 25 GHz) in the even mode slightly increases, the reflected power in the frequency band between the resonant frequency in the even mode and the resonant frequency (about 31 GHz) in the odd mode decreases. This makes it possible to maintain a return loss of 6 dB or more in the entire target frequency band as illustrated in FIG. 4.

Figure 5:
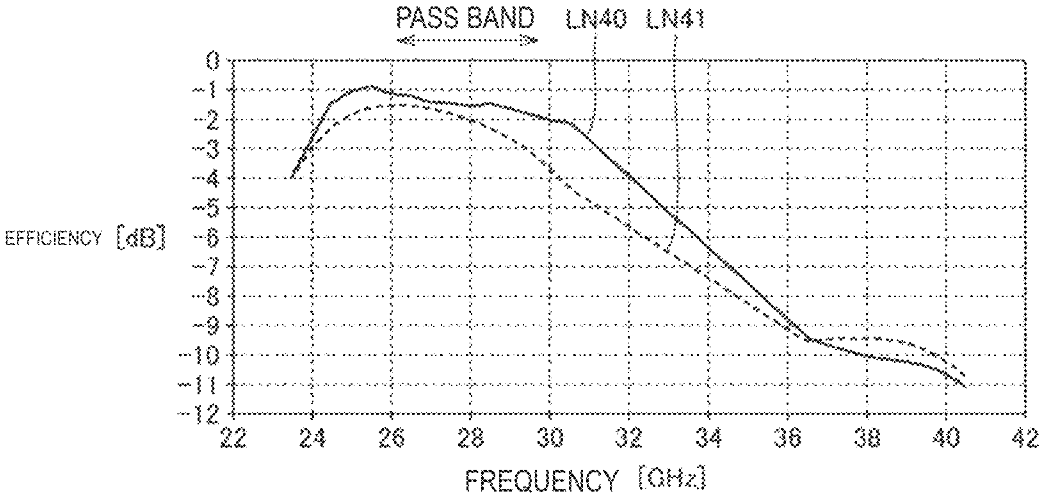
FIG. 5 is a second diagram for describing antenna characteristics in the first embodiment and the comparative examples.

FIG. 5 is a diagram illustrating simulation results of efficiency in the first embodiment in FIG. 4 for a case in which the parasitic element 170 is provided (a solid line LN40) and a case in which the parasitic element 170 is not provided (a dotted line LN41). As illustrated in FIG. 5, the efficiency (i.e., the antenna gain) in the target frequency band is improved by providing the parasitic element 170.

As described above, by providing the peripheral electrode 160 and disposing the parasitic element 170 away from the radiating element 121, it is possible to increase the frequency bandwidth of a radio wave with a polarization direction in which the region of the ground electrode GND is limited while maintaining the antenna gain.

"Peripheral electrode 160" in the first embodiment correspond to "first peripheral electrode" in this disclosure. "Parasitic elements 1701 and 1702" in the first embodiment correspond to "first electrode" and "second electrode" in this disclosure, respectively. "Peripheral electrodes 1601 and 1602" in the first embodiment correspond to "first element" and "second element" in this disclosure, respectively. "Positive X-axis direction", "negative X-axis direction", "positive Y-axis direction", and "negative Y-axis direction" in the first embodiment correspond to "first direction", "second direction", "third direction", and "fourth direction" in this disclosure, respectively.

Second Embodiment

In the first embodiment, an antenna module for emitting radio waves in a single frequency band is described. In an example described in a second embodiment, features of this disclosure are applied to a so-called dual-band antenna module that can emit radio waves in two different frequency bands.

Figure 6:
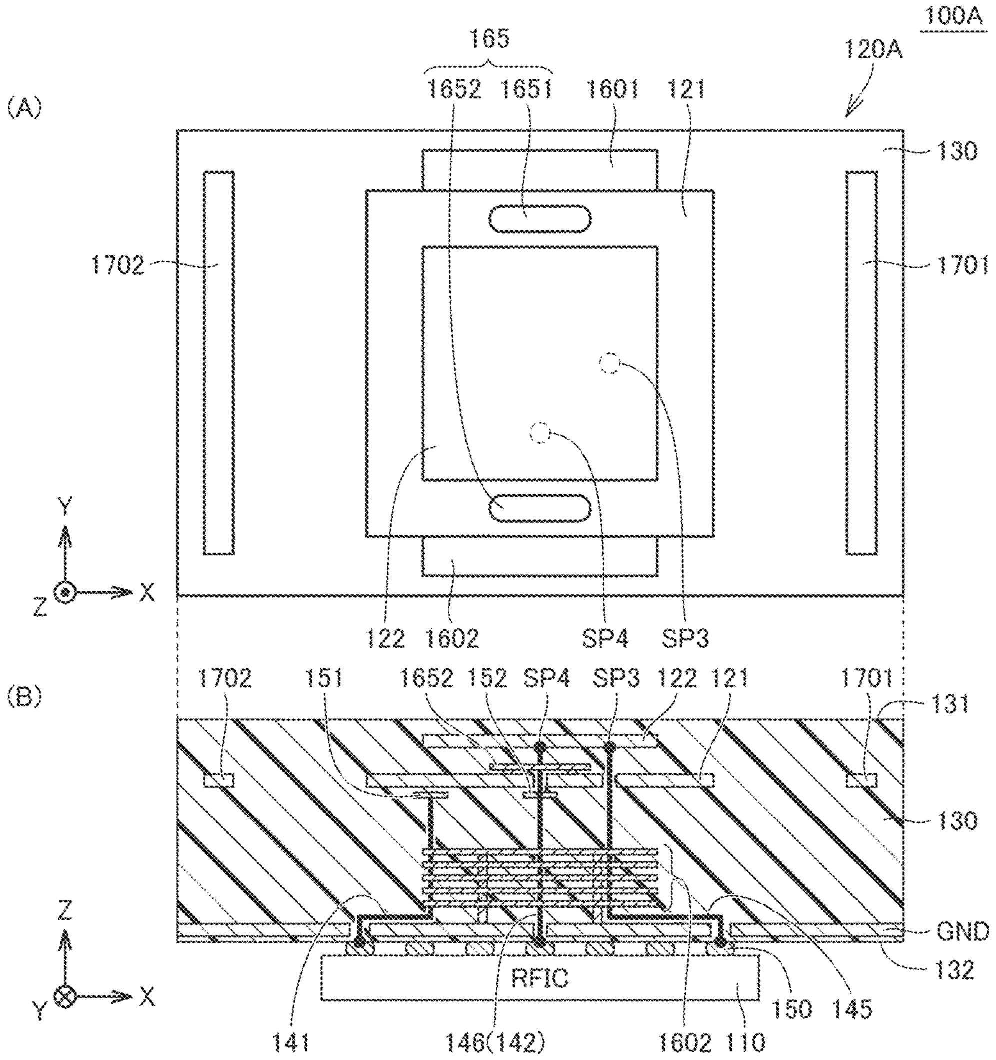
FIG. 6 is a plan view and a side transparent view of an antenna module according to a second embodiment.

FIG. 6 is a plan view and a side transparent view of an antenna module 100A according to the second embodiment. In addition to the configuration of the antenna module 100 of the first embodiment, an antenna device 120A of the antenna module 100A includes a radiating element 122, peripheral electrodes 1651 and 1652, and feeding wires 145 and 146. Here, descriptions of components in FIG. 6 corresponding to the components of the antenna module 100 in FIG. 2 are not repeated.

Referring to FIG. 6, in the antenna module 100A, the radiating element 122 is disposed in the dielectric substrate 130 to face the radiating element 121 at a position closer to the upper surface 131 than the radiating element 121. In other words, in plan view of the dielectric substrate 130 from the normal direction, the radiating element 121 and the radiating element 122 overlap each other.

Similarly to the radiating element 121, the radiating element 122 is a planar electrode with a substantially square shape. The size of the radiating element 122 is smaller than the size of the radiating element 121 and therefore, the resonant frequency of the radiating element 122 is higher than the resonant frequency of the radiating element 121. Accordingly, the radiating element 122 emits radio waves in a frequency band higher than the frequency band of radio waves emitted from the radiating element 121.

The radiating element 122 receives radio frequency signals from the RFIC 110 via the feeding wires 145 and 146. The feeding wire 145 extends from the RFIC 110, passes through the ground electrode GND, and is connected to a feeding point SP3 of the radiating element 122. The feeding wire 146 extends from the RFIC 110, passes through the ground electrode GND, and is connected to a feeding point SP4 of the radiating element 122. Similarly to the feeding wires 141 and 142, the feeding wires 145 and 146 may be capacitively coupled to the feeding points SP3 and SP4.

The feeding point SP3 is offset from the center of the radiating element 122 in the positive X-axis direction, and the feeding point SP4 is offset from the center of the radiating element 122 in the negative Y-axis direction. With this configuration, a radio wave with a polarization direction corresponding to the X-axis direction and a radio wave with a polarization direction corresponding to the Y-axis direction are emitted from the radiating element 122.

On the radiating element 121, the peripheral electrodes 1651 and 1652 are disposed along the sides of the radiating element 121 that extend in the X-axis direction. The peripheral electrode 1651 is disposed along the positive Y-axis side of the radiating element 121, and the peripheral electrode 1652 is disposed along the negative Y-axis side of the radiating element 121. In the descriptions below, the peripheral electrodes 1651 and 1652 may be collectively referred to as a "peripheral electrode 165".

The peripheral electrode 165 is a planar electrode and is electrically connected to the radiating element 121. The dimension of the peripheral electrode 165 along the X-axis direction is shorter than the dimension of a side of the radiating element 122 along the X-axis. The peripheral electrode 165 is disposed near the center of the radiating element 122 in the X-axis direction.

The radiating element 121 functions as a ground electrode for the radiating element 122, and radio waves are emitted from the radiating element 122 due to electromagnetic field coupling between the radiating element 122 and the radiating element 121. Accordingly, the peripheral electrode 165 functions similarly to the peripheral electrode 160 for the radiating element 121. That is, by providing the peripheral electrode 165, it is possible to increase the Q value of an antenna formed by the radiating element 122 and improve the antenna gain.

Although not illustrated in FIG. 6, similarly to the parasitic elements 170 for the radiating element 121, parasitic elements may also be provided for the radiating element 122 to increase the frequency band.

"Radiating element 121" and "radiating element 122" in the second embodiment correspond to "first radiating element" and "second radiating element" in this disclosure, respectively. "Peripheral electrode 165" in the second embodiment corresponds to "second peripheral electrode" in this disclosure. "Peripheral electrode 1651" and "peripheral electrode 1652" in the second embodiment correspond to "third element" and "fourth element" in this disclosure, respectively.

Third Embodiment

In an example described in a third embodiment, features of this disclosure are applied to an array antenna in which multiple radiating elements are disposed adjacent to each other on a dielectric substrate.

Figure 7:
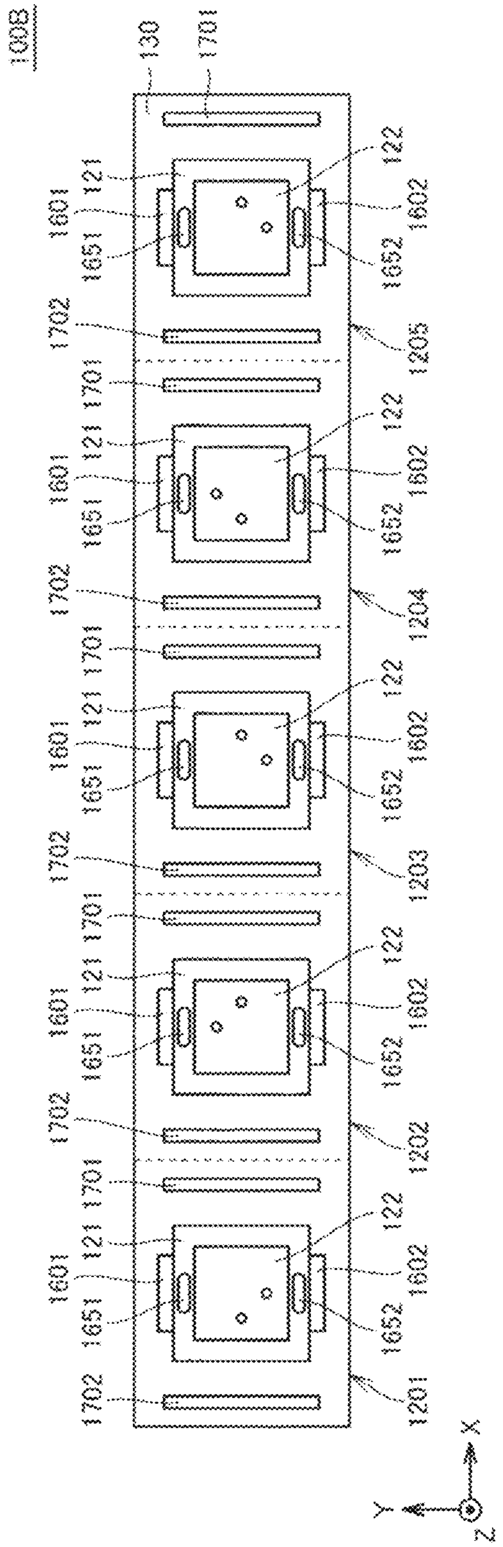
FIG. 7 is a plan view of an antenna module according to a third embodiment.

FIG. 7 is a plan view of an antenna module 100B according to the third embodiment. The antenna module 100B has a configuration in which five antennas 1201 to 1205, each of which has a dual-band configuration as described in the second embodiment, are arranged in a row next to each other along the X-axis of the dielectric substrate 130. That is, the antenna module 100B is an array antenna in which radiating elements are arranged in a 1×5 one-dimensional array.

In the antenna module 100B, the positions of feeding points of adjacent antennas are rotated from each other by 90 degrees or 180 degrees. Taking the adjacent antennas 1201 and 1202 as an example, the feeding points of the radiating element 122 of the antenna 1201 are located in positions that are offset from the center of the radiating element 122 in the negative X-axis direction and the negative Y-axis direction. On the other hand, the feeding points of the radiating element 122 of the antenna 1202 are located in positions that are offset from the center of the radiating element 122 in the positive X-axis direction and the positive Y-axis direction. That is, the positions of feeding points corresponding to radio waves with different polarization directions are rotated from each other by 180 degrees. Regarding the antenna 1202 and the antenna 1203, the positions of feeding points corresponding to radio waves with different polarization directions are rotated from each other by 90 degrees. Although not illustrated in FIG. 7, the above descriptions also apply to the radiating elements 121 on the low frequency side; and the positions of feeding points of adjacent antennas are rotated from each other by 90 degrees or 180 degrees.

In the antenna module 100B, to align the phases of radio waves having polarization directions and emitted from the radiating elements of the antennas, radio frequency signals with phase differences corresponding to the rotational angles are supplied to the feeding points of the radiating elements.

By placing the corresponding feeding points of adjacent antennas in positions that are rotated by 90 degrees or 180 degrees from each other as described above, it is possible to improve the cross polarization discrimination (XPD) of radio waves having two polarization directions and emitted from each radiating element.

In each of the antennas 1201 to 1205 of the antenna module 100B, the peripheral electrode 160 and the parasitic element 170 are provided for the radiating element 121 on the low frequency side, and the peripheral electrode 165 is provided for the radiating element 122 on the high frequency side. This makes it possible to increase the frequency bandwidth while maintaining the antenna gain.

In the example of FIG. 7, each antenna of the antenna module 100B is a dual-band antenna. However, each antenna of an array antenna may include the radiating element 121.

In the third embodiment, one of any two adjacent antennas among the antennas 1201 to 1205 corresponds to "first antenna" in this disclosure, and the other one of the two adjacent antennas corresponds to "second antenna" in this disclosure.

First Variation

In a configuration described in a first variation, one of adjacent parasitic elements of two adjacent antennas of an array antenna is removed, and the remaining one of the adjacent parasitic elements is shared by the two antennas.

Figure 8:
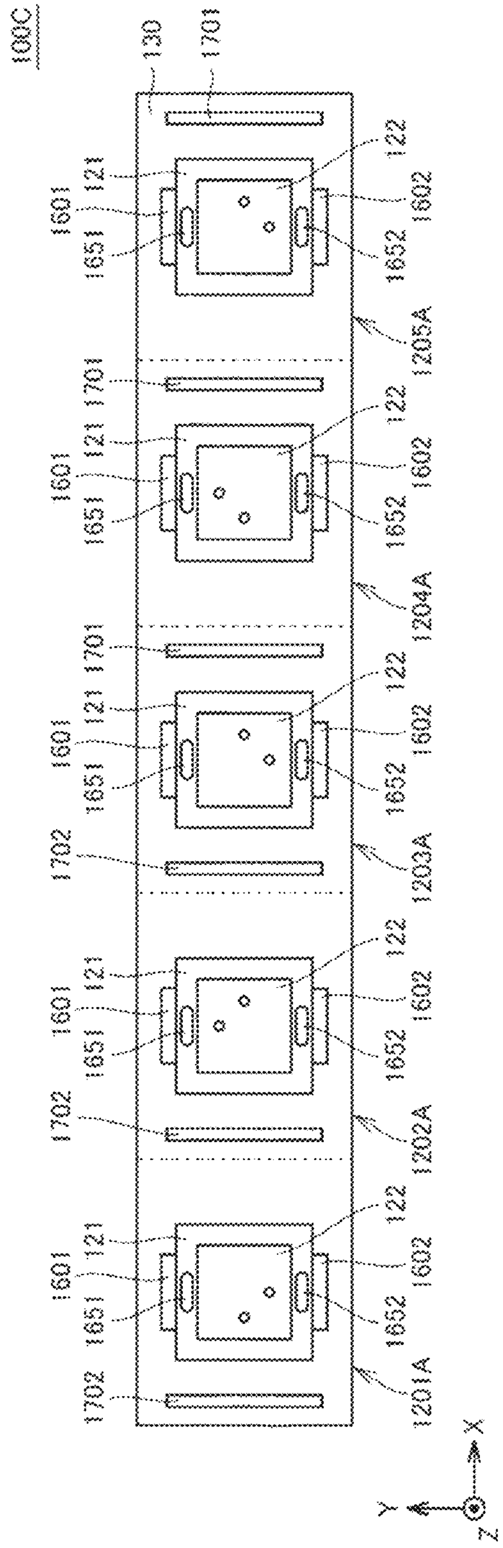
FIG. 8 is a plan view of an antenna module according to a first variation.

FIG. 8 is a plan view of an antenna module 100C of the first variation. The antenna module 100C has a configuration obtained by removing, from the configuration of the antenna module 100B in FIG. 7, a parasitic element disposed on the outer side in the X-axis direction of the dielectric substrate 130 among the parasitic elements 1701 and 1702 disposed between radiating elements of two adjacent antennas. In other words, in each of five antennas 1201A to 1205A, one of the parasitic elements 1701 and 1702 closer to the center of the dielectric substrate 130 is removed, and the other one of the parasitic elements 1701 and 1702 is shared by two adjacent antennas.

For example, in each of the antennas 1201A and 1202A, the parasitic element 1701 on the positive X-axis side is removed. On the other hand, in each of the antennas 1204A and 1205A, the parasitic element 1702 on the negative X-axis side is removed. The antenna 1203A located in the center of the array antenna includes both of the parasitic elements 1701 and 1702. Removing one of adjacent parasitic elements as described above makes it possible to alleviate the coupling between the adjacent parasitic elements and thereby makes it possible to appropriately adjust the active S parameter of each radiating element. This in turn makes it possible to optimize the antenna characteristics in the Y-axis direction of the entire array antenna.

In each of the antennas 1201A to 1205A, one of two parasitic elements, which is closer and has stronger electromagnetic field coupling, is more likely to influence the antenna characteristics. Therefore, even with the configuration of the antenna module 100C in which one of two parasitic elements is removed, it is possible to increase the frequency band as with the antenna module 100B of the third embodiment.

Second Variation

In a configuration described in a second variation, adjacent parasitic elements of two adjacent antennas of an array antenna are connected to each other.

Figure 9:
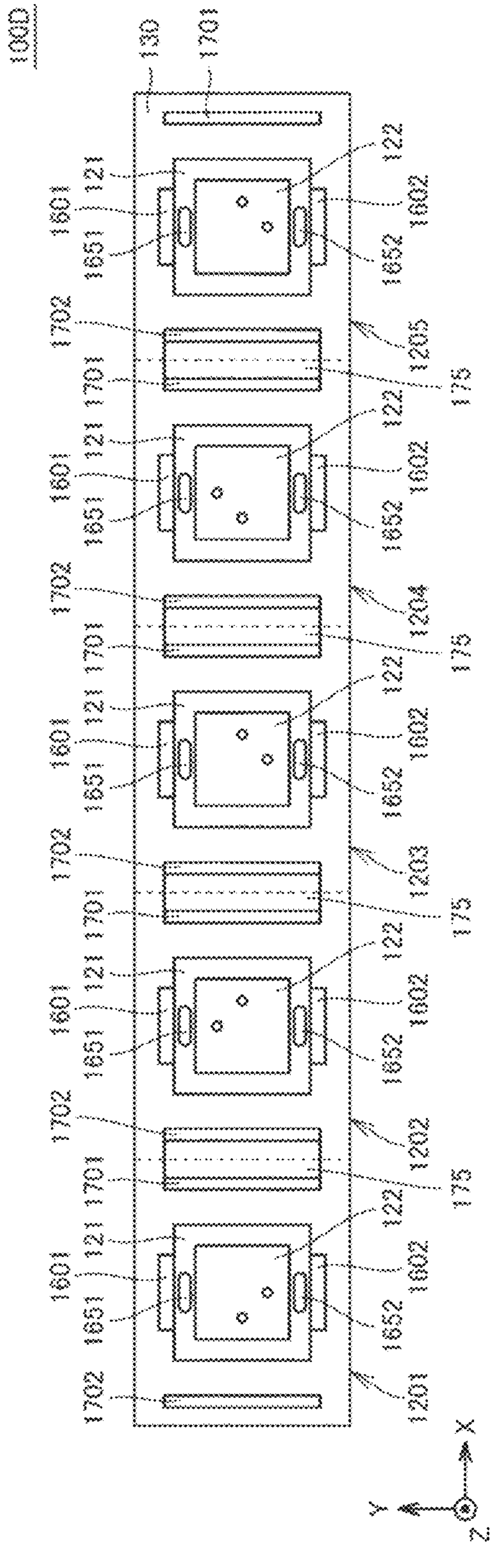
FIG. 9 is a plan view of an antenna module according to a second variation.

FIG. 9 is a plan view of an antenna module 100D of the second variation. In the antenna module 100D, two parasitic elements 1701 and 1702, which are disposed to face each other and belong to adjacent antennas among the antennas 1201 to 1205, are connected to each other via a connection electrode 175.

Connecting adjacent parasitic elements to each other as described above makes it possible to reduce the current density of the parasitic elements and thereby makes it possible to increase the amount of radio emission in the emission direction (the Z-axis direction).

Figure 10:
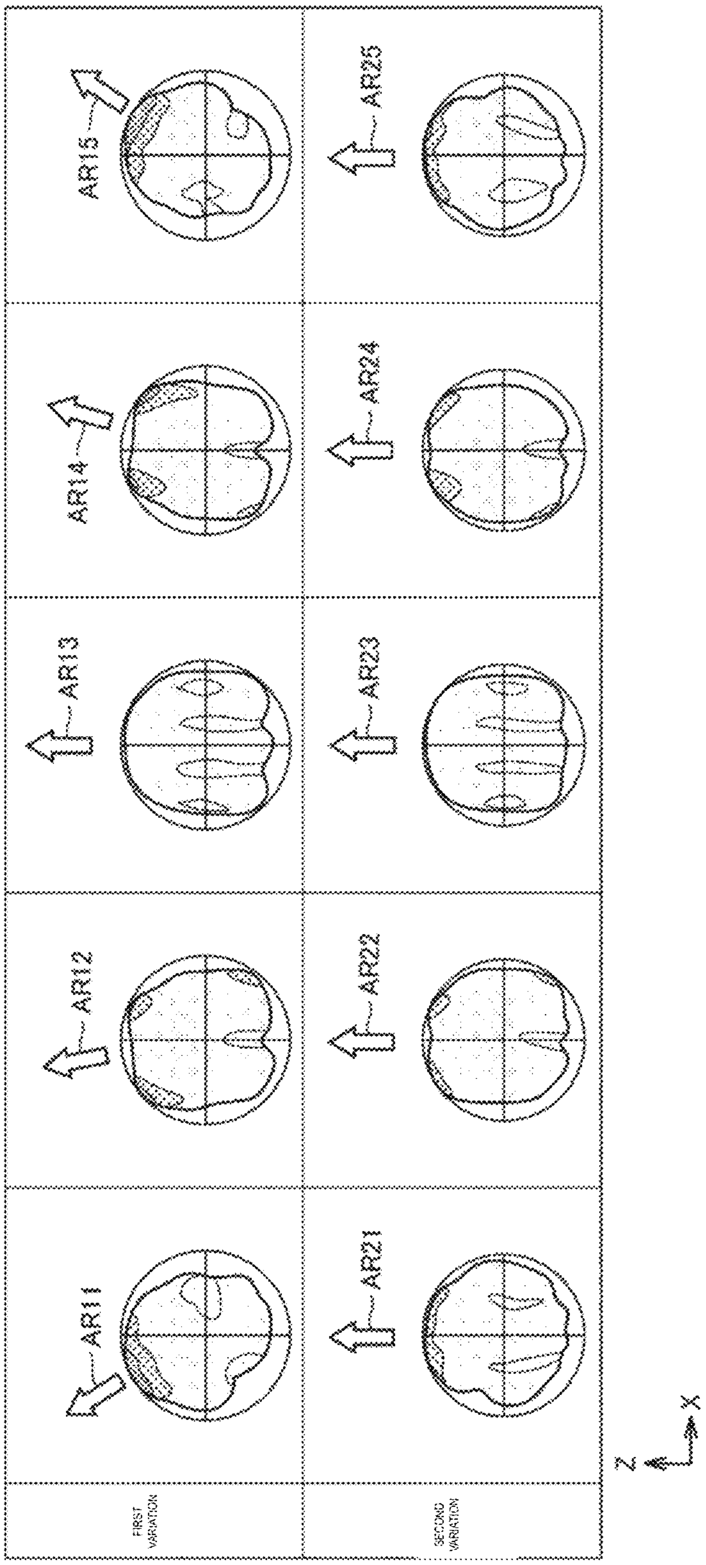
FIG. 10 is a diagram for describing the directivity of the antenna modules according to the first variation and the second variation.

Next, with reference to FIG. 10, the directivity of the antenna module 100C of the first variation and the antenna module 100D of the second variation are described. FIG. 10 illustrates the distribution of the peak gain of each antenna in the antenna modules 100C and 100D in the odd mode (i.e., at around 29.5 GHz).

Referring to FIG. 10, in the case of the antenna 1203A included in the antenna module 100C of the first variation and disposed in the center of the dielectric substrate 130, because both of the parasitic elements 1701 and 1702 are provided on the sides of the radiating element, the radio emission direction substantially corresponds to the Z-axis direction as indicated by an arrow AR13. However, as the location of the antenna moves outward from the center of the dielectric substrate 130, the radio emission direction changes from the Z-axis direction to the outward direction.

More specifically, in the case of the antennas 1201A and 1202A disposed in the negative X-axis direction from the center of the dielectric substrate 130, radio waves are emitted in directions that are tilted from the Z-axis in the negative direction as indicated by arrows AR11 and AR12. On the other hand, in the case of the antennas 1204A and 1205A disposed in the positive X-axis direction from the center of the dielectric substrate 130, radio waves are emitted in directions that are tilted from the Z-axis in the positive direction as indicated by arrows AR14 and AR15. In each of the antennas 1201A, 1202A, 1204A, and 1205A of the antenna module 100C, because one of the parasitic elements is removed, the coupling between the remaining parasitic element and the radiating element becomes relatively stronger, and the directivity of radio waves is tilted toward the remaining parasitic element. As a result, in each of the antennas 1201A, 1202A, 1204A, and 1205A, the peak gain is slightly increased.

In the case of the antenna module 100D of the second variation, because a parasitic element is provided on each side of each radiating element, radio waves are emitted substantially in the Z-axis direction from all antennas as indicated by arrows AR21 to AR25.

Thus, the antenna module 100C of the first variation can emit radio waves in a wide range, and the antenna module 100D of the second variation can emit radio waves intensively in the front direction (the Z-axis direction). That is, one of the configurations of the first variation and the second variation can be adopted depending on desired directivity.

Third Variation

In a configuration described in a third variation, in a dual-band array antenna, parasitic elements are also provided for a radiating element on the high frequency side.

Figure 11:
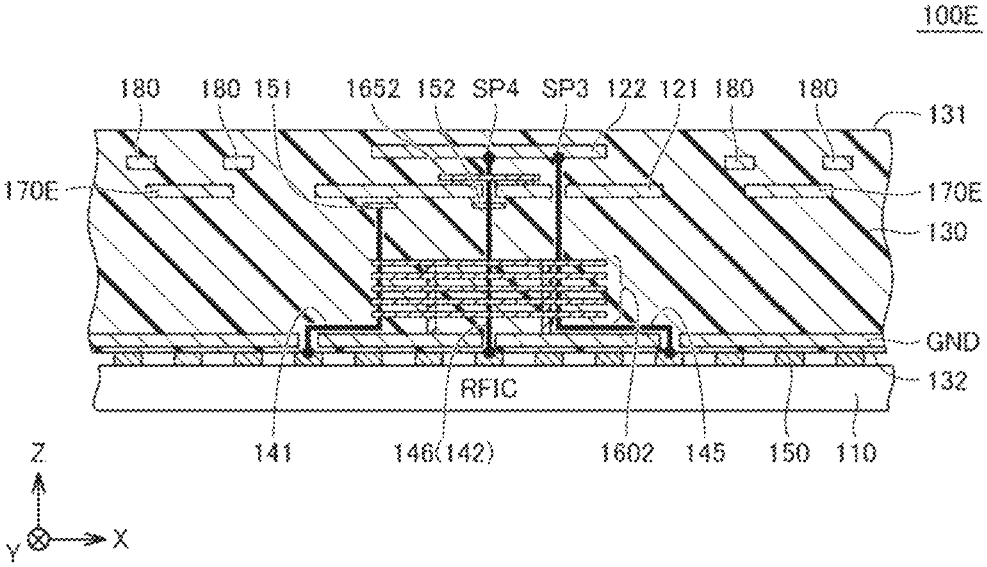
FIG. 11 is a side transparent view of a part of an antenna module according to a third variation.

FIG. 11 is a side transparent view of a part of an antenna module 100E of the third variation. In the antenna module 100E, adjacent parasitic elements 170E for the radiating elements 121 on the low frequency side are connected to each other as in the second variation described above.

On the other hand, parasitic elements 180 for the radiating element 122 on the high frequency side are provided separately for each antenna. The parasitic elements 180 are located closer to the upper surface 131 than the parasitic elements 170E and closer to the radiating elements 121 and 122 than the parasitic elements 170E. Although not illustrated in the diagram, the shortest distance between the radiating element 122 and the parasitic elements 180 is greater than the shortest distance between the radiating element 122 and the peripheral electrode 165.

Figure 12:
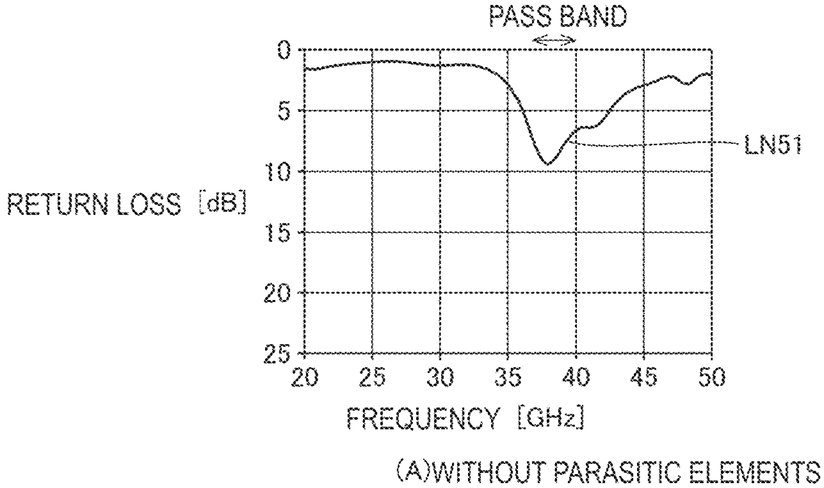
FIG. 12 is a diagram for describing antenna characteristics on the high frequency side of the antenna module according to the third variation.
Figure 12:
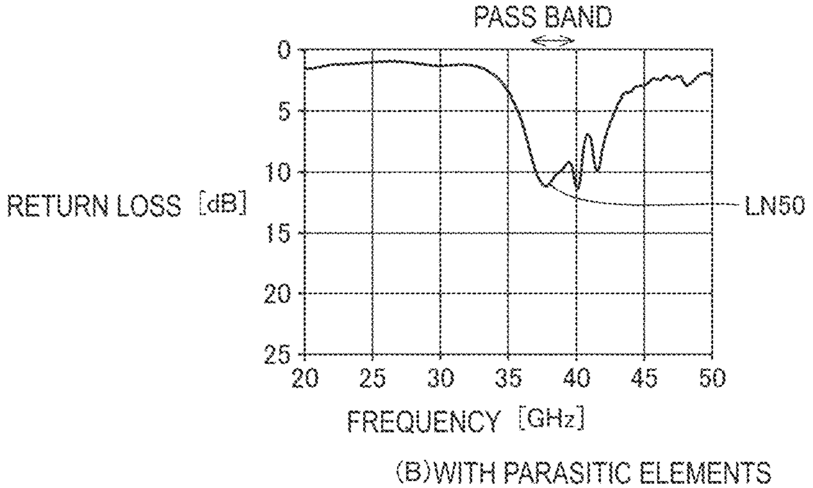

FIG. 12 is a diagram for describing the antenna characteristics on the high frequency side of the antenna module 100E. FIG. 12 includes a graph showing return loss when the parasitic elements 180 are not provided (FIG. 12 (A)) and a graph showing return loss when the parasitic elements 180 are provided (FIG. 12 (B)). In FIG. 12, the target frequency band on the high frequency side is a 39 GHz band (36.5 GHz to 40 GHz).

As shown in FIG. 12, when the parasitic elements 180 are provided (line LN50), the return loss in the target frequency band is reduced compared with a case in which the parasitic elements 180 are not provided (line LN51), and the frequency bandwidth in which return loss of greater than or equal to 6 dB is achievable is increased.

As described above, in a dual-band antenna module, providing parasitic elements also for a radiating element on the high frequency side makes it possible to increase the frequency bandwidth also for radio waves on the high frequency side while maintaining the antenna gain.

Fourth Variation

In the antenna modules described in the third embodiment and the first through third variations, the positions of the feeding points of adjacent antennas in an array antenna are rotated from each other by 90 degrees or 180 degrees.

In a configuration described in a fourth variation, the feeding points of antennas in an array antenna are disposed in the same angular positions.

Figure 13:
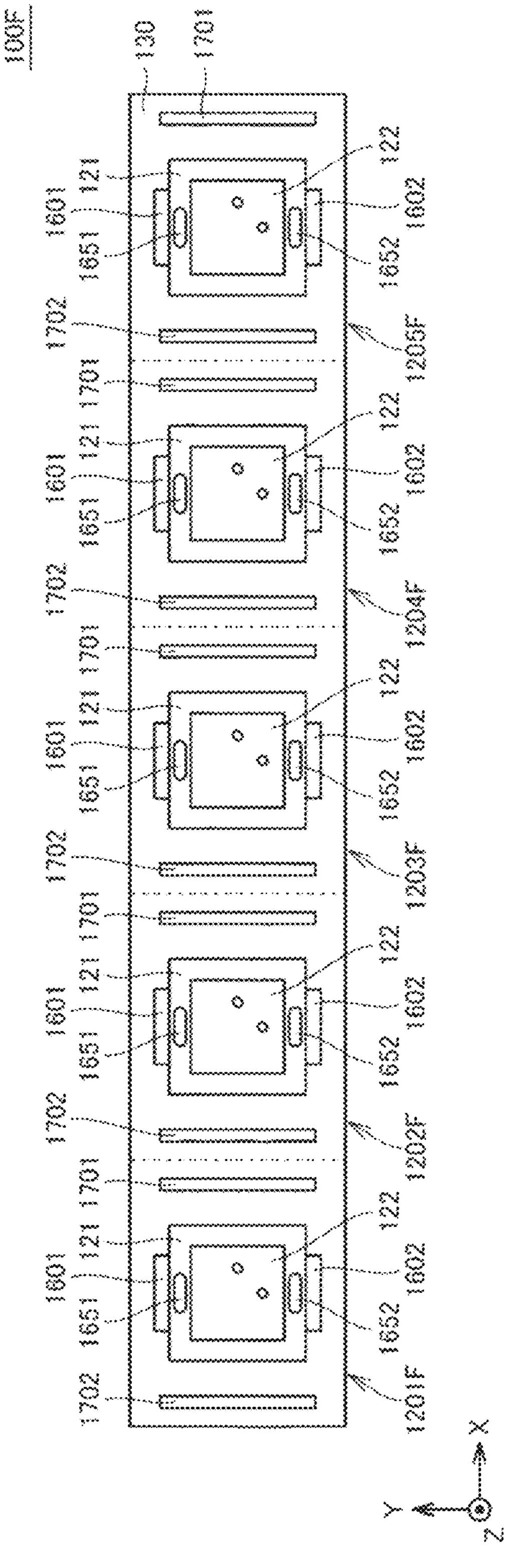
FIG. 13 is a plan view of an antenna module according to a fourth variation.

FIG. 13 is a plan view of an antenna module 100F of the fourth variation. As illustrated in FIG. 13, in antennas 1201F to 1205F of the antenna module 100F, the feeding points of the radiating elements are located in the same angular positions. For example, in any one of the antennas, the feeding points of the radiating element 122 are located in positions that are offset from the center of the radiating element 122 in the positive X-axis direction and in the negative Y-axis direction.

Figure 14:
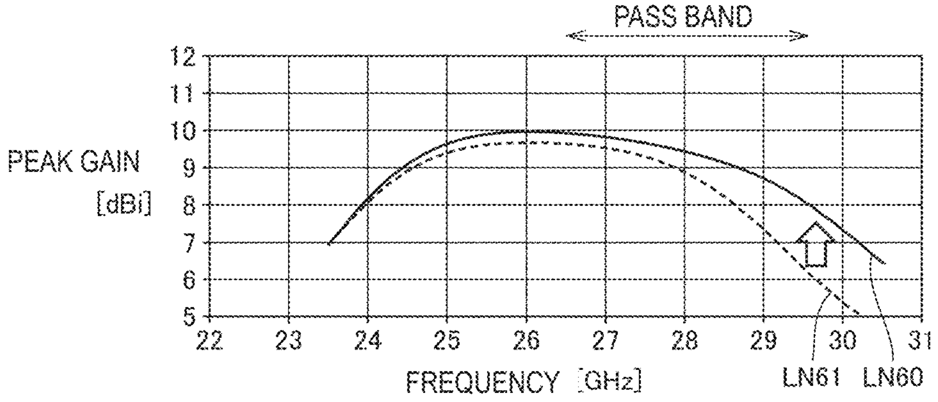
FIG. 14 is a diagram for describing antenna characteristics of the antenna module according to the fourth variation.

FIG. 14 is a graph for describing the antenna characteristics of the antenna module 100F of the fourth variation. In FIG. 14, a solid line LN60 indicates the peak gain on the low frequency side in the case of the antenna module 100F, and a dotted line LN61 indicates the peak gain on the low frequency side in a case where the positions of the feeding points of adjacent antennas are rotated from each other, i.e., in the case of the antenna module 100B of the third embodiment illustrated in FIG. 7. As shown in FIG. 14, because the phase in the feeding direction is constant, the peak gain in the target pass band is improved in the antenna module 100F.

On the other hand, because the phase in the polarization direction is constant, the cross polarization discrimination (XPD) in a case in which the radio emission direction is tilted is lower compared with the antenna module 100B. Accordingly, one of the configurations of the antenna modules 100B and 100F may be selected depending on the desired specification.

Fourth Embodiment

In a configuration described in a fourth embodiment, a rectangular radiating element is tilted with respect to a rectangular dielectric substrate.

Figure 15:
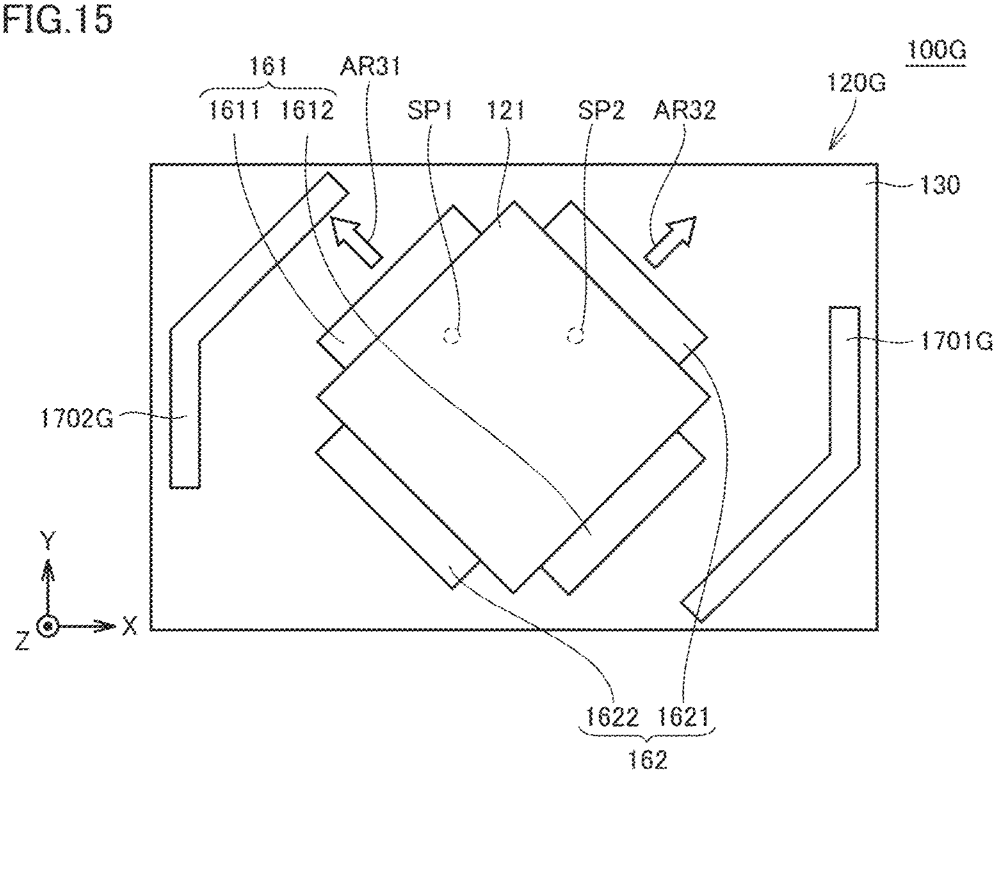
FIG. 15 is a plan view of an antenna module according to a fourth embodiment.

FIG. 15 is a plan view of an antenna module 100G according to the fourth embodiment. As illustrated in FIG. 15, in an antenna device 120G of the antenna module 100G, a substantially square radiating element 121 is oriented such that the sides of the radiating element 121 are tilted with respect to the sides of a rectangular dielectric substrate 130. In the example of FIG. 15, the sides of the radiating element 121 are tilted by about 45 degrees with respect to the sides of the rectangular dielectric substrate 130.

In the radiating element 121, feeding points SP1 and SP2 are located in positions that are offset from the center of the radiating element 121 toward two adjacent sides. More specifically, the feeding point SP1 is located in a position that is offset from the center of the radiating element 121 in a direction tilted from the positive Y-axis direction in the negative X-axis direction by about 45 degrees. With this configuration, when a radio frequency signal is supplied to the feeding point SP1, a radio wave with a polarization direction indicated by an arrow AR31 in FIG. 15 is emitted.

Also, the feeding point SP2 is located in a position that is offset from the center of the radiating element 121 in a direction tilted from the positive Y-axis direction in the positive X-axis direction by about 45 degrees. With this configuration, when a radio frequency signal is supplied to the feeding point SP2, a radio wave with a polarization direction indicated by an arrow AR32 in FIG. 15 is emitted.

Also, in the antenna module 100G, peripheral electrodes 1611, 1612, 1621, and 1622 are disposed close to the radiating element 121 along the corresponding sides of the radiating element 121. The peripheral electrodes 1611 and 1612 are provided for the radio wave with the polarization direction indicated by the arrow AR31, and the peripheral electrodes 1621 and 1622 are provided for the radio wave with the polarization direction indicated by the arrow AR32. The peripheral electrodes 1611 and 1612 may also be collectively referred to as a "peripheral electrode 161", and the peripheral electrodes 1621 and 1622 may also be collectively referred to as a "peripheral electrode 162".

Furthermore, in the antenna module 100G, parasitic elements 1701G and 1702G are disposed in the end portions along two short sides of the dielectric substrate 130. Each of the parasitic elements 1701G and 1702G has a band shape that is bent in the middle from a portion along the short side. The parasitic element 1701G is bent such that a part of the parasitic element 1701G faces the peripheral electrode 1612. The parasitic element 1702G is bent such that a part of the parasitic element 1702G faces the peripheral electrode 1611. In plan view from the Z-axis direction, the peripheral electrodes 161 and 162 are disposed close to the radiating element 121, and the shortest distance between the peripheral electrodes 161 and 162 and the radiating element 121 is less than the shortest distance between the radiating element 121 and the parasitic elements 1701G and 1702G.

Thus, even with an antenna module in which a radiating element is tilted with respect to a dielectric substrate, it is possible to increase the frequency bandwidth for radio waves with respective polarization directions while maintaining the antenna gain by disposing peripheral electrodes close to the radiating element and disposing parasitic elements away from the radiating element.

Fifth Embodiment

In a configuration described in a fifth embodiment, peripheral electrodes are tilted with respect to a radiating element.

Figure 16:
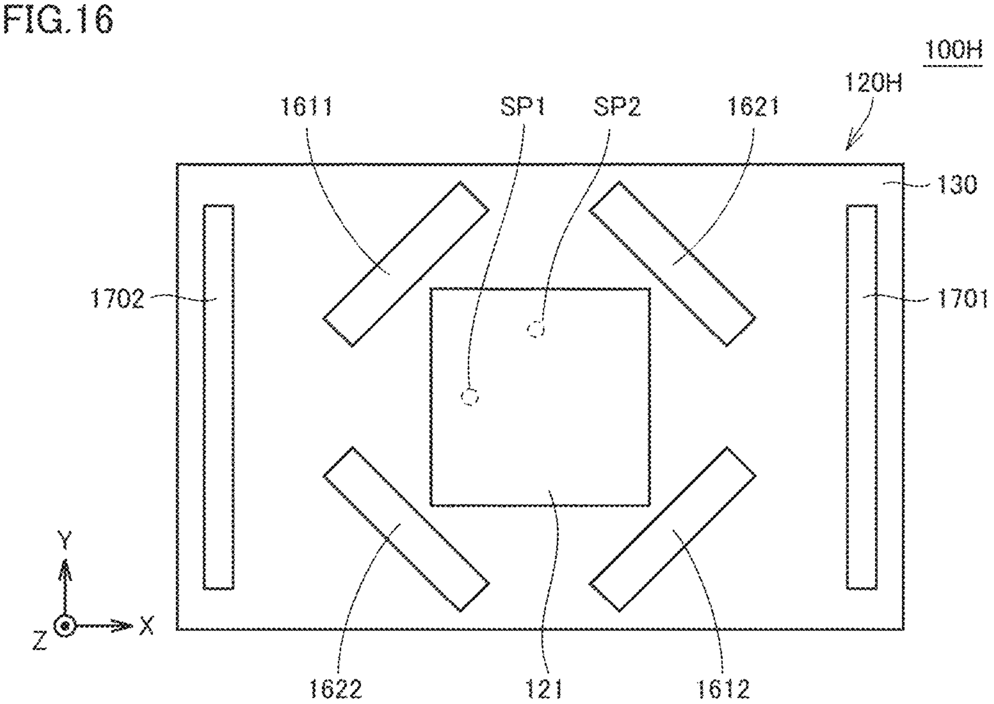
FIG. 16 is a plan view of an antenna module according to a fifth embodiment.

FIG. 16 is a plan view of an antenna module 100H according to the fifth embodiment. As illustrated in FIG. 16, in an antenna device 120H of the antenna module 100H, similarly to the antenna module 100 of the first embodiment, a square radiating element 121 is oriented such that the sides of the radiating element 121 become parallel to the corresponding sides of a rectangular dielectric substrate 130.

In the radiating element 121, a feeding point SP1 is located in a position offset from the center of the radiating element 121 in the negative X-axis direction, and a feeding point SP2 is located in a position offset from the center of the radiating element 121 in the positive Y-axis direction. With this configuration, radio waves with polarization directions corresponding to the X-axis direction and the Y-axis direction are emitted.

Also, in the antenna module 100H, peripheral electrodes 161 and 162 are tilted with respect to the sides of the radiating element 121 and the dielectric substrate 130. In the example of FIG. 16, the peripheral electrodes are tilted by about 45 degrees with respect to the sides of the dielectric substrate 130. In other words, each peripheral electrode is oriented to face one of the vertices of the radiating element 121 and to be parallel to a diagonal line of the radiating element 121.

With such a layout, the electric line of force from each side of the radiating element 121 is coupled with one of the peripheral electrodes 161 and 162 and reaches the ground electrode GND.

Also, in the antenna module 100H, parasitic elements 1701 and 1702 are disposed in the end portions along two short sides of the dielectric substrate 130. In plan view from the Z-axis direction, the peripheral electrodes 161 and 162 are disposed closer to the radiating element 121 than the parasitic elements 1701 and 1702. That is, the shortest distance between the radiating element 121 and the peripheral electrodes 161 and 162 is less than the shortest distance between the radiating element 121 and the parasitic elements 1701 and 1702.

Thus, even with an antenna module in which peripheral electrodes are tilted with respect to a dielectric substrate and a radiating element, it is possible to increase the frequency bandwidth for radio waves with respective polarization directions while maintaining the antenna gain by disposing parasitic elements further away from the radiating element than the peripheral electrodes.

Sixth Embodiment

In a configuration described in a sixth embodiment, the radiating element 121 in the antenna module 100 of the first embodiment is tilted with respect to the dielectric substrate 130.

Figure 17:
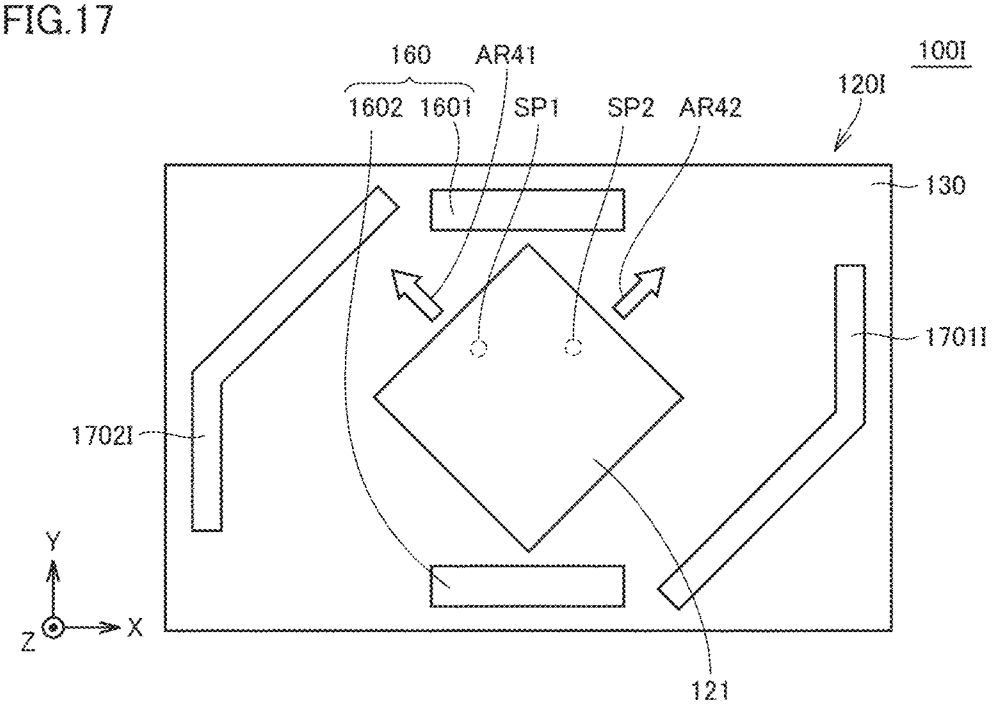
FIG. 17 is a plan view of an antenna module according to a sixth embodiment.

FIG. 17 is a plan view of an antenna module 100I according to the sixth embodiment. In an antenna device 120I of the antenna module 100I, similarly to the antenna module 100 of the first embodiment, the peripheral electrodes 1601 and 1602 are disposed along the long sides of the dielectric substrate 130, and parasitic elements 1701I and 1702I are disposed along the short sides of the dielectric substrate 130. However, each of the parasitic elements 1701I and 1702I of the sixth embodiment has a band shape that is bent in the middle from a portion along the short side.

The parasitic elements 17011 and 1702I are bent such that parts of the parasitic elements 17011 and 1702I face a pair of opposing sides of the radiating element 121.

On the other hand, the radiating element 121 with a square shape is oriented such that the sides of the radiating element 121 are tilted with respect to the dielectric substrate 130. In the example of FIG. 17, the radiating element 121 is tilted by about 45 degrees with respect to the sides of the dielectric substrate 130.

In the radiating element 121, feeding points SP1 and SP2 are located in positions that are offset from the center of the radiating element 121 toward two adjacent sides. When a radio frequency signal is supplied to the feeding point SP1, a radio wave with a polarization direction indicated by an arrow AR41 in FIG. 17 is emitted. Also, when a radio frequency signal is supplied to the feeding point SP2, a radio wave with a polarization direction indicated by an arrow AR42 in FIG. 17 is emitted.

In plan view from the Z-axis direction, the peripheral electrodes 1601 and 1602 are disposed closer to the radiating element 121 than the parasitic elements 17011 and 1702I. That is, the shortest distance between the radiating element 121 and the peripheral electrodes 1601 and 1602 is less than the shortest distance between the radiating element 121 and the parasitic elements 17011 and 1702I.

This configuration of the antenna module 100I can improve the Q value, although the improvement is somewhat limited compared to the antenna modules of the first through fifth embodiments because the sides of the radiating element 121 partially face the peripheral electrodes 160. Also, disposing the parasitic elements 17011 and 1702I further away from the radiating element 121 than the peripheral electrodes 1601 and 1602 makes it possible to increase the frequency bandwidth for radio waves with respective polarization directions while maintaining the antenna gain.

Seventh Embodiment

In a configuration described in a seventh embodiment, similarly to the sixth embodiment, the radiating element 121 in the antenna module 100 is tilted with respect to the dielectric substrate 130 while maintaining the polarization directions.

Figure 18:
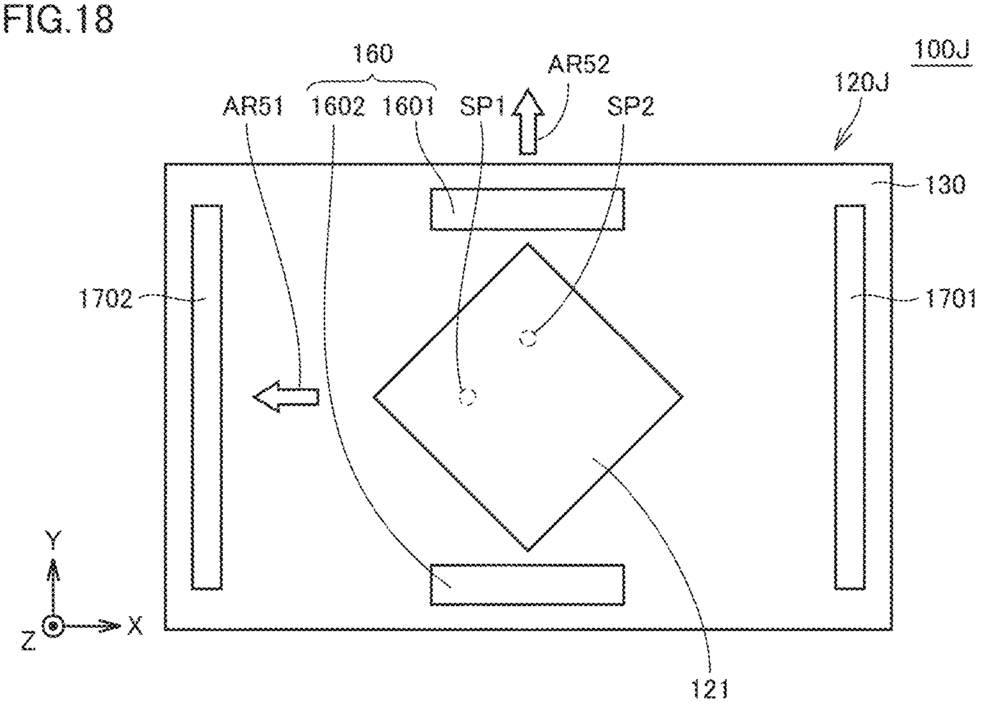
FIG. 18 is a plan view of an antenna module according to a seventh embodiment.

FIG. 18 is a plan view of an antenna module 100J according to the seventh embodiment. In an antenna device 120J of the antenna module 100J, similarly to the antenna module 100 of the first embodiment, the peripheral electrodes 1601 and 1602 are disposed along the long sides of the dielectric substrate 130, and the parasitic elements 1701 and 1702 are disposed along the short sides of the dielectric substrate 130.

On the other hand, the radiating element 121 with a square shape is oriented such that the sides of the radiating element 121 are tilted with respect to the dielectric substrate 130. In the example of FIG. 18, the radiating element 121 is tilted by about 45 degrees with respect to the sides of the dielectric substrate 130.

In the radiating element 121, the feeding point SP1 is located in a position offset from the center of the radiating element 121 in the negative X-axis direction, and the feeding point SP2 is located in a position offset from the center of the radiating element 121 in the positive Y-axis direction. When a radio frequency signal is supplied to the feeding point SP1, a radio wave with a polarization direction corresponding to the X-axis direction (an arrow AR51 in FIG. 18) is emitted. Also, when a radio frequency signal is supplied to the feeding point SP2, a radio wave with a polarization direction corresponding to the Y-axis direction (an arrow AR52 in FIG. 18) is emitted.

This configuration of the antenna module 100J can improve the Q value, although the improvement is somewhat limited compared to the antenna modules of the first through fifth embodiments because the sides of the radiating element 121 partially face the peripheral electrodes 160. Also, disposing the parasitic elements 1701 and 1702 further away from the radiating element 121 than the peripheral electrodes 1601 and 1602 makes it possible to increase the frequency bandwidth for radio waves with respective polarization directions while maintaining the antenna gain.

In the fourth through seventh embodiments, the tilt angle of the radiating element 121 and the peripheral electrodes 161 and 162 with respect to the dielectric substrate 130 is not limited to 45 degrees but may be set at any angle between 0 to 90 degrees.

Fifth Variation

In a configuration described in a fifth variation, a substrate in which a radiating element and parasitic elements are disposed is different from a substrate in which peripheral electrodes and a ground electrode are disposed.

Figure 19:
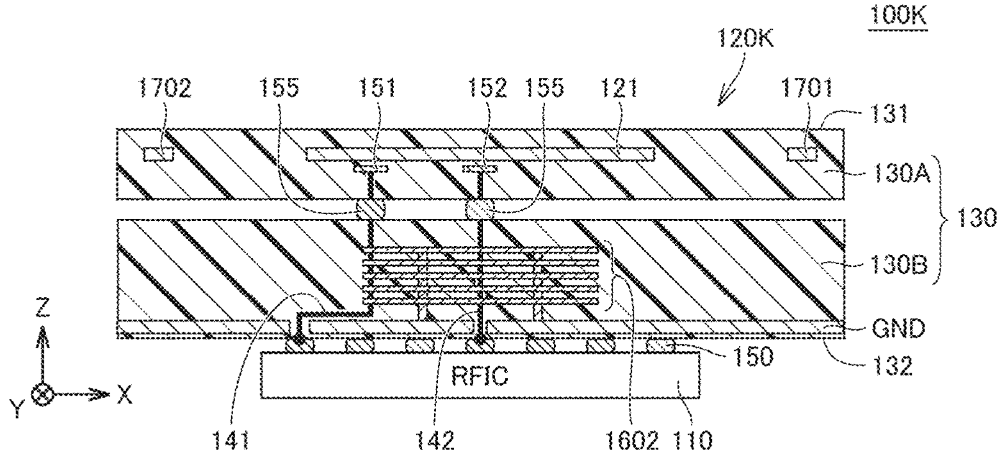
FIG. 19 is a side transparent view of the antenna module according to a fifth variation.

FIG. 19 is a side transparent view of an antenna module 100K of the fifth variation. As illustrated in FIG. 19, in an antenna device 120K of the antenna module 100K, the dielectric substrate 130 includes two substrates 130A and 130B, and the substrate 130A is electrically connected to the substrate 130B via solder bumps 155. Other configurations of the antenna module 100K are the same as those of the antenna module 100 of the first embodiment.

The radiating element 121 and the parasitic elements 1701 and 1702 are disposed in the substrate 130A. On the other hand, the peripheral electrodes 1601 and 1602 and the ground electrode GND are disposed in the substrate 130B, and the RFIC 110 is mounted on the lower surface 132. The substrates 130A and 130B may be formed of the same or different materials and may have the same or different permittivities.

The feeding wires 141 and 142 extend from the substrate 130B to the substrate 130A via the solder bumps 155 and transmit radio frequency signals from the RFIC 110 to the radiating element 121.

Even with a configuration in which a substrate where a radiating element and parasitic elements are disposed is different from a substrate where peripheral electrodes and a ground electrode are disposed, it is possible to increase the frequency bandwidth for radio waves with respective polarization directions while maintaining the antenna gain by disposing the peripheral electrodes close to the radiating element and disposing the parasitic elements away from the radiating element. With a configuration in which separate substrates are electrically connected to each other, it is possible to improve the flexibility of the layout in a communication device.

"Substrate 130A" and "substrate 130B" in the fifth variation correspond to "first substrate" and "second substrate" in this disclosure, respectively.

Sixth Variation

In a configuration described in a sixth variation, parasitic elements are disposed in substrates different from a substrate in which a radiating element is disposed.

Figure 20:
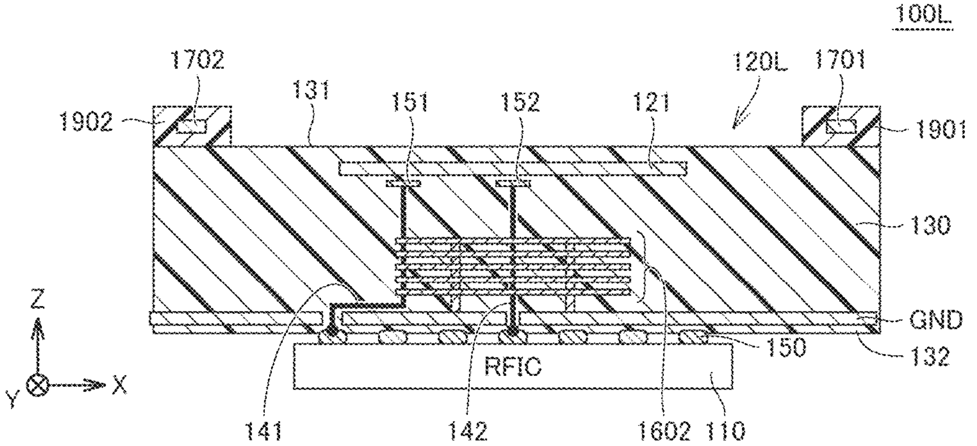
FIG. 20 is a side transparent view of the antenna module according to a sixth variation.

FIG. 20 is a side transparent view of an antenna module 100L of the sixth variation. In an antenna device 120L of the antenna module 100L, the parasitic elements 1701 and 1702 are disposed, respectively, in dielectrics 1901 and 1902 that are separate from the dielectric substrate 130. The dielectrics 1901 and 1902 are disposed on the upper surface 131 of the dielectric substrate 130 at the X-axis ends, i.e., along the short sides, of the dielectric substrate 130. Other configurations of the antenna module 100L are the same as the configuration of the antenna module 100 of the first embodiment.

The permittivity of the dielectrics 1901 and 1902 may be the same as or different from the permittivity of the dielectric substrate 130.

With a configuration in which the parasitic elements 1701 and 1702 are formed in the dielectrics 1901 and 1902 that are separate from the dielectric substrate 130, it is possible to adjust the degree of coupling between the radiating element 121 and the parasitic elements 1701 and 1702 by changing the permittivity of the dielectrics 1901 and 1902. Also, it is possible to increase the frequency bandwidth for radio waves with respective polarization directions while maintaining the antenna gain by disposing peripheral electrodes close to a radiating element and disposing parasitic elements away from the radiating element.

The features of the fifth and sixth variations are also applicable to antenna modules in other embodiments described above.

The above-disclosed embodiments should be considered as examples and not restrictive in all respects. The scope of the present disclosure is defined by the scope of the claims rather than by the above descriptions of the embodiments and is intended to include all modifications within the scope of the claims and the meaning and scope of equivalents.

REFERENCE SIGNS LIST

10 communication device; 100, 100A-100L, 100#1, 100#2 antenna module; 110 RFIC; 111A-111H, 113A-113H, 117A, 117B switch; 112AR-112HR low noise amplifier; 112AT-112HT power amplifier; 114A-114H attenuator; 115A-115H phase shifter; 116A, 116B signal combiner/splitter; 118A, 118B mixer; 119A, 119B amplifier circuit; 120, 120A, 120G-120L antenna device; 1201-1205, 1201A-1205A, 1201F-1205F antenna; 121,121A-121D, 122 radiating element; 130 dielectric substrate, 130A, 130B substrate; 141, 142, 145, 146 feeding wire; 150, 155 solder bump; 151, 152 planar electrode; 160, 1601, 1602, 161, 1611, 1612, 162, 1621, 1622, 165, 1651, 1652 peripheral electrode; 170, 170E, 170I, 1701G, 1701I, 1702, 1702G, 1702I, 170#, 180 parasitic element; 175 connection electrode, 1901, 1902 dielectric; 200 BBIC; GND ground electrode; SP1-SP4, SP1A, SP2A feeding point

The invention claimed is:

1. An antenna module comprising:
a dielectric substrate having a long side and a short side;
a ground electrode disposed in the dielectric substrate;
a planar radiating element disposed to face the ground electrode;
a first peripheral electrode that is disposed along the long side of the dielectric substrate and electrically connected to the ground electrode; and
a parasitic element that is disposed along the short side of the dielectric substrate and disposed away from the radiating element, wherein
the radiating element has a first feeding point and a second feeding point, wherein the first feeding point is at a position offset from the center in the first direction along the long side and the second feeding point is at a position offset from the center in the second direction along the short side; and
a shortest distance between the radiating element and the parasitic element is greater than a shortest distance between the radiating element and the first peripheral electrode.

2. The antenna module according to claim 1, wherein
the parasitic element includes
a first element disposed away from the radiating element in a first direction along the long side, and
a second element disposed away from the radiating element in a second direction opposite to the first direction; and
the first peripheral electrode includes
a first electrode disposed in a third direction, which is along the short side, from the radiating element, and
a second electrode disposed in a fourth direction, which is opposite to the third direction, from the radiating element.

3. The antenna module according to claim 2, wherein
a length of the first peripheral electrode in the first direction is less than a length of the radiating element in the first direction.

4. The antenna module according to claim 3, wherein
a length of the parasitic element in the third direction is greater than a length of the radiating element in the third direction.

5. The antenna module according to claim 4, wherein
a length of the first peripheral electrode in the first direction is greater than a length of the parasitic element in the first direction.

6. The antenna module according to claim 5, wherein
each of the first electrode and the second electrode includes multiple planar electrodes that are disposed in different positions in a normal direction of the dielectric substrate and vias that connect the multiple planar electrodes to the ground electrode.

7. The antenna module according to claim 6, wherein
in plan view from a normal direction of the dielectric substrate, the first peripheral electrode partially overlaps the radiating element.

8. The antenna module according to claim 7, wherein
the first peripheral electrode is disposed between the radiating element and the ground electrode in a normal direction of the dielectric substrate.

9. The antenna module according to claim 8, wherein
the radiating element includes
a first radiating element configured to emit a radio wave in a first frequency band, and
a second radiating element configured to emit a radio wave in a second frequency band higher than the first frequency band;
the first radiating element is disposed between the second radiating element and the ground electrode in a normal direction of the dielectric substrate to face the second radiating element and the ground electrode; and
the antenna module further comprises a second peripheral electrode disposed over the first radiating element along the long side of the dielectric substrate.

10. The antenna module according to claim 9, wherein
the second peripheral electrode further includes
a third element disposed away from the radiating element in the first direction, and a fourth element disposed away from the radiating element in the second direction;

the first element and the second element are provided for the first radiating element;

the third element and the fourth element are provided for the second radiating element; and the third element and the fourth element are disposed closer to the radiating element than the first element and the second element.

11. The antenna module according to claim 1, wherein the dielectric substrate includes a first substrate in which the radiating element is disposed and a second substrate that is separate from the first substrate and in which the ground electrode and the first peripheral electrode are disposed.

12. The antenna module according to claim 1, further comprising:

a dielectric that is disposed on the dielectric substrate and in which the parasitic element is formed.

13. The antenna module according to claim 1, further comprising:

a feed circuit configured to supply a radio frequency signal to the radiating element.

14. A communication device comprising:

the antenna module according to claim 1.

15. The antenna module according to claim 2, wherein a length of the parasitic element in the third direction is greater than a length of the radiating element in the third direction, a length of the first peripheral electrode in the first direction is greater than a length of the parasitic element in the first direction, each of the first electrode and the second electrode includes multiple planar electrodes that are disposed in different positions in a normal direction of the dielectric substrate and vias that connect the multiple planar electrodes to the ground electrode.

16. The antenna module according to claim 15, wherein in plan view from a normal direction of the dielectric substrate, the first peripheral electrode partially overlaps the radiating element, the first peripheral electrode is disposed between the radiating element and the ground electrode in a normal direction of the dielectric substrate.

17. An antenna module comprising:

a dielectric substrate having a long side and a short side;

a ground electrode disposed in the dielectric substrate;

a first antenna disposed in the dielectric substrate; and a second antenna disposed adjacent to the first antenna in a first direction along the long side of the dielectric substrate, wherein each of the first antenna and the second antenna includes a planar radiating element disposed to face the ground electrode, a peripheral electrode that is disposed along the long side of the dielectric substrate and electrically connected to the ground electrode, and a parasitic element disposed along the short side of the dielectric substrate and disposed away from the radiating element;

the radiating element has a first feeding point and a second feeding point, wherein the first feeding point is at a position offset from the center in the first direction tilted from the long side and the second feeding point is at a position offset from the center in the second direction tilted from the short side; and in each of the first antenna and the second antenna, a shortest distance between the radiating element and the parasitic element is greater than a shortest distance between the radiating element and the peripheral electrode.

18. The antenna module according to claim 17, wherein the parasitic element of each of the first antenna and the second antenna includes a first element disposed away from the radiating element in the first direction, and a second element disposed away from the radiating element in a second direction opposite to the first direction; and the first element of the first antenna and the second element of the second antenna are implemented by a shared element.

19. The antenna module according to claim 17, wherein the parasitic element of each of the first antenna and the second antenna includes a first element disposed away from the radiating element in the first direction, and a second element disposed away from the radiating element in a second direction opposite to the first direction; and the first element of the first antenna is connected to the second element of the second antenna.

20. An antenna module comprising:

a dielectric substrate having a long side and a short side;

a ground electrode disposed in the dielectric substrate;

a planar radiating element disposed to face the ground electrode;

a first peripheral electrode that is tilted with respect to the long side of the dielectric substrate and electrically connected to the ground electrode; and a parasitic element that is disposed along the short side of the dielectric substrate and disposed away from the radiating element, wherein the radiating element has a first feeding point and a second feeding point, wherein the first feeding point is at a position offset from the center in the first direction along the long side and the second feeding point is at a position offset from the center in the second direction along the short side; and a shortest distance between the radiating element and the parasitic element is greater than a shortest distance between the radiating element and the first peripheral electrode.

* * * * *